(12) United States Patent
Baek et al.

(10) Patent No.: US 8,659,739 B2
(45) Date of Patent: Feb. 25, 2014

(54) LIQUID CRYSTAL LENS AND DISPLAY INCLUDING THE SAME

(75) Inventors: Jong-In Baek, Suwon-si (KR); Kee-Han Uh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 81 days.

(21) Appl. No.: 13/290,919

(22) Filed: Nov. 7, 2011

(65) Prior Publication Data

US 2013/0002970 A1   Jan. 3, 2013

(30) Foreign Application Priority Data

Jun. 30, 2011   (KR) .................. 10-2011-0064896

(51) Int. Cl.
*G02F 1/13* (2006.01)
*G02F 1/1335* (2006.01)
*G02F 1/1343* (2006.01)

(52) U.S. Cl.
USPC ............. 349/200; 349/15; 349/122; 349/138; 349/139

(58) Field of Classification Search
USPC ............ 349/15, 122, 138, 143, 187, 200, 139
See application file for complete search history.

(56) References Cited

U.S. PATENT DOCUMENTS

| | | | | |
|---|---|---|---|---|
| 5,066,109 A | * | 11/1991 | Kuratate et al. | ................. 349/85 |
| 5,644,415 A | * | 7/1997 | Aoki et al. | .................... 349/122 |
| 2004/0257494 A1 | * | 12/2004 | Park | ................................ 349/65 |
| 2005/0007518 A1 | * | 1/2005 | Kato | ................................ 349/69 |
| 2006/0125784 A1 | * | 6/2006 | Jang et al. | ..................... 345/156 |
| 2007/0229754 A1 | * | 10/2007 | Galstian et al. | ............... 349/200 |
| 2011/0128456 A1 | * | 6/2011 | Son | ................................. 349/15 |

FOREIGN PATENT DOCUMENTS

| | | | |
|---|---|---|---|
| JP | 04-069620 | * | 3/1992 |
| JP | 2002-2680065 | | 9/2002 |
| KR | 1020060124143 | | 12/2006 |
| KR | 1020070082109 | | 8/2007 |
| KR | 1020080105572 | | 12/2008 |
| KR | 1020090065934 | | 6/2009 |

* cited by examiner

*Primary Examiner* — Dung Nguyen
*Assistant Examiner* — Tai Duong
(74) *Attorney, Agent, or Firm* — Knobbe Martens Olson & Bear LLP

(57) ABSTRACT

Provided are a liquid crystal lens which controls an optical path, and a display including the liquid crystal lens. The liquid crystal lens includes a first and a second electrode which face each other, a liquid crystal layer interposed between the first electrode and the second electrode and has flat top and bottom surfaces, and a dielectric layer interposed between the second electrode and the liquid crystal layer, where the dielectric layer includes a first and a second dielectric sub-layer, the first dielectric sub-layer made of a material having a different dielectric constant from that of the second dielectric sub-layer, the first dielectric sub-layer includes one or more unit patterns, a surface of each of the unit patterns includes a plurality of flat sections, and a height of each of the unit patterns in a first flat section is different from the height thereof in a second flat section.

26 Claims, 27 Drawing Sheets

LIQUID CRYSTAL LENS AND DISPLAY INCLUDING THE SAME

CROSS-REFERENCE TO RELATED APPLICATIONS

This application claims priority from Korean Patent Application No. 10-2011-0064896 filed on Jun. 30, 2011 in the Korean Intellectual Property Office, the disclosure of which is incorporated herein by reference in its entirety.

BACKGROUND

1. Field

The present disclosure relates to a liquid crystal lens which controls an optical path and a display including the liquid crystal lens.

2. Description of the Related Technology

A display displays an image by emitting light using various methods. A light emission method used by a display often serves as a basis for determining the type of the display. Various researches are being competitively conducted on light emission methods in order to effectively control the luminance of emitted light and improve display quality.

Research into a stereoscopic image display which displays a three-dimensional (3D) image by controlling an optical path has also recently been drawing a lot of attention. Such a stereoscopic image display is based on the principle that a viewer perceives a stereoscopic image when a left image is input to the viewer's left eye and a right image is input to the viewer's right eye. A polarized method (such as, for example, a glasses method), a time-division method, a parallax-barrier method (such as, for example, a glasses-free method), a lenticular or microlens method, and a blinking light method are among those being researched.

Watching only 3D images for a long time could cause a viewer to feel dizzy. In addition, the viewer may want to watch not only 3D image contents but also two-dimensional (2D) image contents.

SUMMARY OF CERTAIN INVENTIVE ASPECTS

Aspects of the present invention provide a liquid crystal lens which can control an optical path.

Aspects of the present invention also provide a display which can control an optical path.

However, aspects of the present invention are not restricted to the one set forth herein. The above and other aspects of the present invention will become more apparent to one of ordinary skill in the art to which the present invention pertains by referencing the detailed description of embodiments of the present invention given below.

If an optical path can be controlled differently according to mode, it is possible to display both 2D and 3D images. Controlling the optical path freely can have various light-based applications in addition to displays.

According to one aspect, there is provided a liquid crystal lens comprising: a first electrode and a second electrode which face each other; a liquid crystal layer which is interposed between the first electrode and the second electrode and has a flat top surface and a flat bottom surface; and a dielectric layer which is interposed between the second electrode and the liquid crystal layer, wherein the dielectric layer comprises a first dielectric sub-layer and a second dielectric sub-layer, the first dielectric sub-layer is made of a material having a different dielectric constant from that of a material that forms the second dielectric sub-layer, the first dielectric sub-layer comprises one or more unit patterns, a surface of each of the unit patterns comprises a plurality of flat sections, and a height of each of the unit patterns in a first flat section among the flat sections is different from the height thereof in a second flat section.

According to another aspect, there is provided a liquid crystal lens comprising: a first electrode; a liquid crystal layer which is disposed on the first electrode; a dielectric layer which is disposed on the liquid crystal layer; and a second electrode which is formed conformally on a top surface of the dielectric layer, wherein the dielectric layer comprises one or more unit patterns, a top surface of each of the unit patterns comprises a plurality of flat sections, and a height of each of the unit patterns in a first flat section among the flat sections is different from the height thereof in a second flat section.

According to another aspect, there is provided a display comprising: a light providing apparatus; and a liquid crystal lens which is disposed on the light providing apparatus, wherein the liquid crystal lens comprises: a first electrode and a second electrode which face each other; a liquid crystal layer which is interposed between the first electrode and the second electrode and has a flat top surface and a flat bottom surface; and a dielectric layer which is interposed between the second electrode and the liquid crystal layer, wherein the dielectric layer comprises a first dielectric sub-layer and a second dielectric sub-layer, the first dielectric sub-layer is made of a material having a different dielectric constant from that of a material that forms the second dielectric sub-layer, the first dielectric sub-layer comprises one or more unit patterns, a surface of each of the unit patterns comprises a plurality of flat sections, and a height of each of the unit patterns in a first flat section among the flat sections is different from the height thereof in a second flat section.

According to another aspect, there is provided a method of manufacturing a liquid crystal lens, the method comprising: forming a dielectric layer on a first electrode; and placing a liquid crystal layer and a second electrode on the dielectric layer, wherein the dielectric layer comprises a first dielectric sub-layer and a second dielectric sub-layer, the first dielectric sub-layer is made of a material having a different dielectric constant from that of a material that forms the second dielectric sub-layer, the first dielectric sub-layer comprises one or more unit patterns, a surface of each of the unit patterns comprises a plurality of flat sections, and a height of each of the unit patterns in a first flat section among the flat sections is different from the height thereof in a second flat section.

BRIEF DESCRIPTION OF THE DRAWINGS

The above and other aspects and features will become more apparent by describing in detail certain embodiments with reference to the attached drawings, in which.

DETAILED DESCRIPTION OF CERTAIN INVENTIVE EMBODIMENTS

The present invention will now be described more fully hereinafter with reference to the accompanying drawings, in which certain embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers generally indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The term "elastance", as used herein, means the reciprocal of capacitance.

Hereinafter, certain embodiments of the present invention will be described with reference to the attached drawings.

Figure 1:
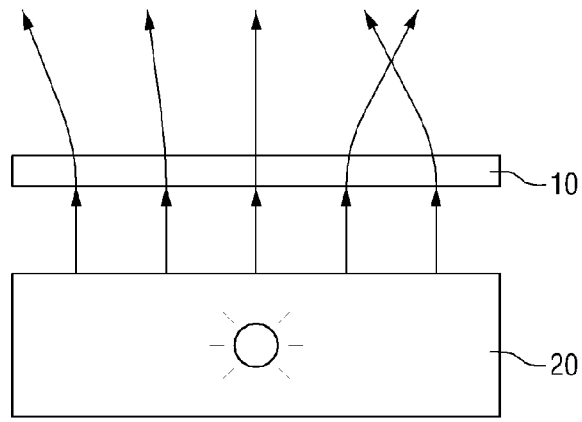
FIG. 1 is a schematic diagram illustrating the configuration of an embodiment of a display.

FIG. 1 is a schematic diagram illustrating the configuration of a display 30 according to an exemplary embodiment of the present invention. Referring to FIG. 1, the display 30 includes a light providing apparatus 20 and a liquid crystal lens 10 disposed on a side of the light providing apparatus 20.

The light providing apparatus 20 provides light to the liquid crystal lens 10. Light provided to the liquid crystal lens 10 by the light providing apparatus 20 may include light emitted from the light providing apparatus 20 and/or light incident from the liquid crystal lens 10 and reflected by the light providing apparatus 20.

The light providing apparatus 20 may include a display panel. In some embodiments, the display panel may be a self-luminous display panel such as an organic light-emitting diode (OLED) display panel, a light-emitting diode (LED) display panel, an inorganic electroluminescent (EL) display panel, a field emission display (FED) display panel, a surface-conduction electron-emitter display (SED) panel, a plasma display panel (PDP), a cathode ray tube (CRT) display panel, or the like. In some other embodiments, the display panel may be a non-luminous display panel such as a liquid crystal display (LCD) panel or an electrophoretic display (EPD) panel. In embodiments where the display panel is a non-luminous display panel, the light providing apparatus 20 may further include a light source such as, for example, a backlight assembly.

The liquid crystal lens 10 is disposed on a side of the light providing apparatus 20 and receives light from the light providing apparatus 10. The liquid crystal lens 10 at least partially modulates characteristics (such as the path or phase) of incident light. In some embodiments, the liquid crystal lens 10 may modulate characteristics of light differently according to mode. The liquid crystal lens 10 may not modulate characteristics of light in a first mode but may modulate characteristics of light in a second mode. Modulating light characteristics differently according to mode may enable modulating an image output from the display panel of the light providing apparatus 20 differently according to mode. Accordingly, the output image can be controlled differently according to mode by the liquid crystal lens 10. Such selective modulation of light characteristics according to mode by the liquid crystal lens 10 makes it possible to realize a two-dimensional (2D)/three-dimensional (3D) switchable display, as will be described later.

Figure 2:
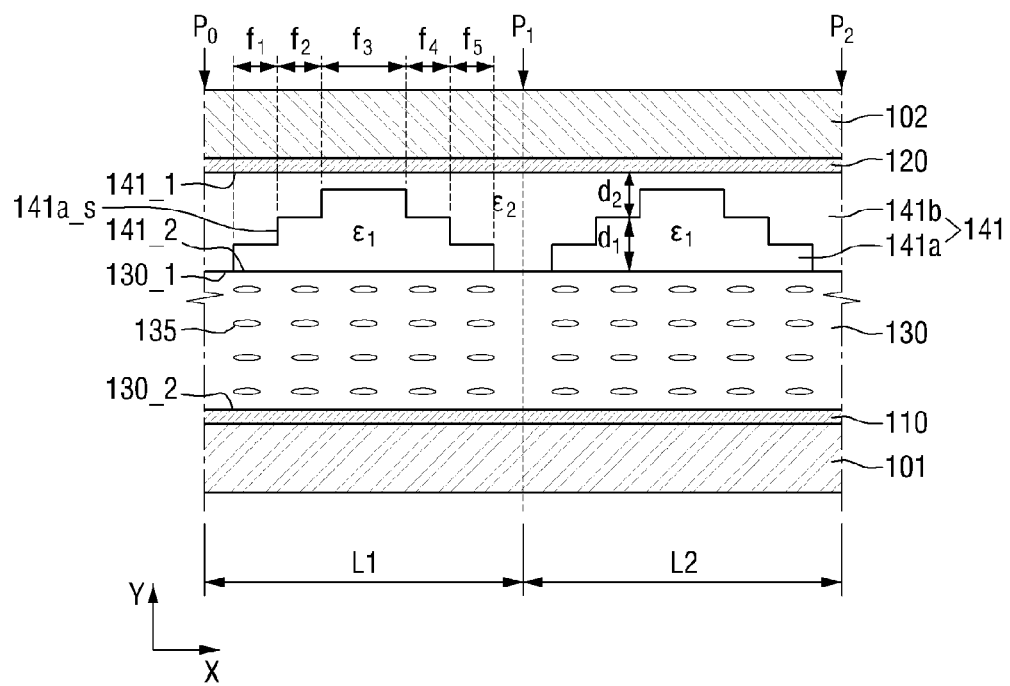
FIG. 2 is a cross-sectional view of an embodiment of a liquid crystal lens.

Hereinafter, an embodiment of a liquid crystal lens will be described in greater detail. FIG. 2 is a cross-sectional view of an embodiment of a liquid crystal lens 1100. In FIG. 2, X indicates a horizontal direction, and Y indicates a vertical direction. Referring to FIG. 2, the liquid crystal lens 1100 includes a first electrode 110 and a second electrode 120 which face each other and a liquid crystal layer 130 and a dielectric layer 141 which are interposed between the first electrode 110 and the second electrode 120.

The first electrode 110 may be formed on a first substrate 101. The second electrode 120 may be formed on a second substrate 102. The first substrate 101 and the second substrate 102 may be transparent substrates. In some embodiments, the first substrate 101 and the second substrate 102 may be transparent plastic substrates, transparent glass substrates, or transparent quartz substrates. In some embodiments, at least one of the first substrate 101 and the second substrate 102 may be a flexible substrate.

Each of the first electrode 110 and the second electrode 120 may be made of a transparent conductive material. Each of the first electrode 110 and the second electrode 120 may be made of oxide such as indium tin oxide (ITO), indium zinc oxide (IZO), zinc oxide (ZO), indium Oxide (IO), or titanium oxide (TiO). In other embodiments, each of the first electrode 110 and the second electrode 120 may contain a material such as carbon nanotubes (CNTs), metal nanowires, or conductive polymer. The first electrode 110 and the second electrode 120 may not necessarily be made of the same material.

A first voltage is applied to the first electrode 110, and a second voltage is applied to the second electrode 120. An electric field corresponding to a difference between the first voltage and the second voltage may be formed between a top surface of the first electrode 110 and a bottom surface of the second electrode 120.

In some embodiments, each of the first electrode 110 and the second electrode 120 may be an unpatterned, whole-surface electrode. The first electrode 110 and the second electrode 120 may be placed parallel to each other.

The liquid crystal layer 130 and the dielectric layer 141 are interposed between the first electrode 110 and the second electrode 120. In FIG. 2, the liquid crystal layer 130 is stacked on the first electrode 110, and the dielectric layer 141 is stacked on the liquid crystal layer 130.

A top surface 130_1 and a bottom surface 130_2 of the liquid crystal layer 130 may be substantially flat. The flat top and bottom surfaces 130_1 and 130_2 of the liquid crystal layer 130 may contribute to uniform distribution of liquid crystal molecules 135. Further, the top surface 130_1 and the bottom surface 130_2 of the liquid crystal layer 130 may be parallel to each other.

In a space defined by the top surface 130_1 and the bottom surface 130_2, the liquid crystal layer 130 includes the liquid crystal molecules 135. The liquid crystal molecules 135 may be distributed with a uniform density over the entire region of the liquid crystal layer 130. In some embodiments, the liquid crystal molecules 135 have positive dielectric anisotropy and are initially aligned in the horizontal direction. When the liquid crystal molecules 135 are initially aligned in the horizontal direction, a long axis of the liquid crystal molecules 135 is parallel to the horizontal direction. In this state, the liquid crystal molecules 135 may have an azimuth of, for example, about 0 degrees.

In some other embodiments, the liquid crystal molecules 135 may have negative dielectric anisotropy. In such embodiments, the liquid crystal molecules 135 may initially be aligned in the vertical direction. When the liquid crystal molecules 135 are initially aligned in the vertical direction, they not only have an azimuth of 90 degrees but also are pretilted at a certain angle. From this perspective, the azimuth of the liquid crystal molecules 135 initially aligned in the vertical direction may be, for example, about 80 to about 90 degrees.

A first alignment film (not shown) which initially aligns the liquid crystal molecules 135 within the liquid crystal layer 130 may be interposed between the first electrode 110 and the bottom surface 130_2 of the liquid crystal layer 130. In addition, a second alignment film (not shown) may be interposed between the top surface 130_1 of the liquid crystal layer 130 and a bottom surface 141_2 of the dielectric layer 141.

The dielectric layer 141 includes a first dielectric sub-layer 141a and a second dielectric sub-layer 141b. The first dielectric sub-layer 141a and the second dielectric sub-layer 141b have different dielectric constants. In some embodiments, the dielectric constant of the first dielectric sub-layer 141a may be ∈1, and the dielectric constant of the second dielectric sub-layer 141b may be ∈2, which may be greater than ∈1. The first dielectric sub-layer 141a may have the same refractive index as the second dielectric sub-layer 141b. In some embodiments, the refractive index of the first dielectric sub-layer 141a may be different from the refractive index of the second dielectric sub-layer 141b.

The top and bottom surfaces 141_1 and 141_2 of the dielectric layer 141 may be flat. The top and bottom surfaces 141_1 and 141_2 of the dielectric layer 141 may be parallel to each other. In FIG. 2, a top surface of the second dielectric sub-layer 141b forms the top surface 141_1 of the dielectric layer 141, and a bottom surface of the first dielectric sub-layer 141a and a bottom surface of the second dielectric sub-layer 141b form the bottom surface 141_2 of the dielectric layer 141.

The first dielectric sub-layer 141a may include one or more unit patterns. The unit patterns may be separated from each other and may have substantially the same shape. The unit patterns may be arranged uniformly. That is, the unit patterns may be arranged with a predetermined pitch. In such embodiments, a gap between every two neighboring unit patterns may be constant.

A surface of at least one of the unit patterns of the first dielectric sub-layer 141a includes a plurality of flat sections f1 through f5. In the embodiment of FIG. 2, a top surface of each unit pattern includes five flat sections, first through fifth flat sections f1 through f5. A distance from a bottom surface of each unit pattern to the top surface thereof is different in at least two of the first through fifth flat sections f1 through f5. A height of each unit pattern is different in two or more flat sections.

At least two of a height of a unit pattern of the first dielectric sub-layer 141a in the first flat section f1, the height of the unit pattern in the second flat section f2, the height of the unit pattern in the third flat section f3, the height of the unit pattern in the fourth flat section f4, and the height of the unit pattern in the fifth flat section f5 have different values. In FIG. 2, each unit pattern has different heights in neighboring flat sections but may have the same height in non-neighboring flat sections. In some embodiments, the height of a unit pattern in the first flat section f1 may be equal to that of the unit pattern in the fifth flat section f5, and the height of the unit pattern in the second flat section f2 may be equal to that of the unit pattern in the fourth flat section f4.

Neighboring flat sections are connected by each vertical sidewall 141a_s. If the bottom surface of the first dielectric sub-layer 141a is flat and parallel to the top surface thereof, a length of each vertical sidewall 141a_s may be a difference between heights of a unit pattern in neighboring flat sections.

The first through fifth flat sections f1 through f5 and the vertical sidewalls 141a_s are connected to each other to form a substantially stair shape.

The second dielectric sub-layer 141b is formed on the first dielectric sub-layer 141a. The second dielectric sub-layer 141b may completely cover the first dielectric sub-layer 141a.

A plurality of unit lens sections L1 and L2 may be defined by the unit patterns of the first dielectric sub-layer 141a. The first unit lens section L1 may be defined as a section which includes a first unit pattern. In FIG. 2, a section between a position P0 and a position P1 may be the first unit lens section L1. The second unit lens section L2 which neighbors the first unit lens section L1 may be defined as a section which includes a second unit pattern which neighbors the first unit pattern. In FIG. 2, a section between the position P1 and a position P2 may be the second unit lens section L2. If the unit patterns have the same shape and are arranged uniformly with a predetermined pitch, a boundary (such as, for example, the position P1) between the first unit lens section L1 and the second unit lens section L2 may be set to the center of a space by which the first unit pattern and the second unit pattern are separated from each other.

Each of the first and second unit lens sections L1 and L2 may exhibit optical characteristics similar to those of an optical lens, such as a convex lens or a concave lens, according to voltages applied to the first electrode 110 and the second electrode 120. The optical characteristics of each of the first and second unit lens sections L1 and L2 may vary according to the voltages applied to the first electrode 110 and the second electrode 120. Each of the first and second unit lens sections L1 and L2 may function as a variable lens.

A single optical lens can be understood as exhibiting modulation characteristics of a single ray of light. Rays of light incident on a surface of a convex lens are refracted differently according to positions at which the rays of light are incident. However, the convex lens may collect, for example, concentrate the rays of light into a single ray of light and modulate the single ray of light. Each of the first and second unit lens sections L1 and L2 of the liquid crystal lens 1100 may have light modulation characteristics corresponding to those of an optical lens. The first unit lens section L1 may exhibit first light modulation characteristics, and the second unit lens section L2 may exhibit second light modulation characteristics. The first light modulation characteristics may be substantially the same as the second light modulation characteristics. In some embodiments, both the first light modulation characteristics and the second light modulation characteristics may be optical characteristics of a convex lens. In such embodiments, the first unit lens section L1 and the second unit lens section L2 may operate as if two optically identical convex lenses were arranged.

The light modulation characteristics of each of the first and second unit lens sections L1 and L2 will be described in detail with reference to FIGS. 3 through 7 as well as FIG. 2.

Within one unit lens section L1 or L2, the capacitance and the elastance between the top and bottom surfaces 141_1 and 141_2 of the dielectric layer 141 is different in each of the first through fifth flat sections f1 through f5. Assuming that a height of the first dielectric sub-layer 141a at a given horizontal position is d1, that a height of the second dielectric sub-layer 141b is d2, and that the top and bottom surfaces 141_1 and 141_2 of the entire dielectric layer 141 are flat and parallel to each other, the following equation may be established.

$$D = d1 + d2 \quad (1)$$

where D is a distance between the top and bottom surfaces 141_1 and 141_2 of the entire dielectric layer 141 and is a constant.

Elastance 1/C between the top and bottom surfaces 141_1 and 141_2 of the dielectric layer 141 at each horizontal position may be given by Equation (2) below.

$$1/C = 1/C_1 + 1/C_2 = d_1/\in_1 S + d_2/\in_2 S, \quad (2)$$

where C1 is capacitance of the first dielectric sub-layer 141a, C2 is capacitance of the second dielectric sub-layer 141b, and S is a cross-sectional area.

Equations (1) and (2) may be rearranged into Equation (3) below.

$$1/C = (d_1 \in_2 + d_2 \in_1)/\in_1 \in_2 S = \{(\in_2 - \in_1)d_1 + D \in_1\}/\in_1 \in_2 S \quad (3).$$

Since $\in_1$, $\in_2$, D and S can all be treated as constants in Equation (3), the capacitance C and the elastance 1/C of the dielectric layer 141 may vary according to the height d1 of the first dielectric sub-layer 141a. When $\in_2$ is greater than $\in_1$, ($\in_2 - \in_1$) is a positive number. Thus, the elastance 1/C of the dielectric layer 141 increases as the height d1 of the first dielectric sub-layer 141a increases.

Figure 3:
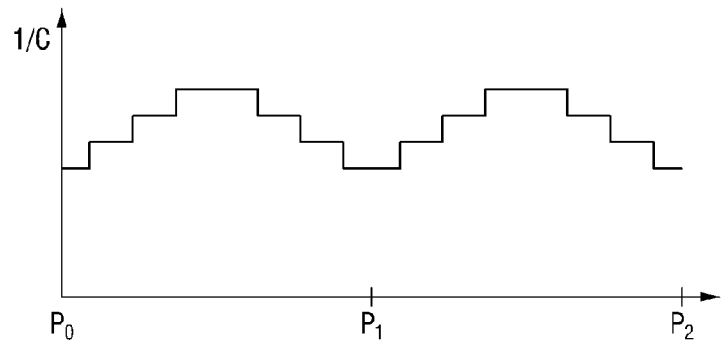
FIG. 3 is a graph illustrating the elastance of a dielectric layer of FIG. 2 at each position.

In the embodiment of FIG. 2, the height d1 of the first dielectric sub-layer 141a is different in each of the first through fifth flat sections f1 through f5. Accordingly, the capacitance C and the elastance 1/C of the dielectric layer 141 is different in each of the first through fifth flat sections f1 through f5 of the first dielectric sub-layer 141a. Referring to FIG. 3, a graph of elastance 1/C of the dielectric layer 141 in the horizontal direction may have similar patterns to the patterns of the first dielectric sub-layer 141a.

Figure 4:
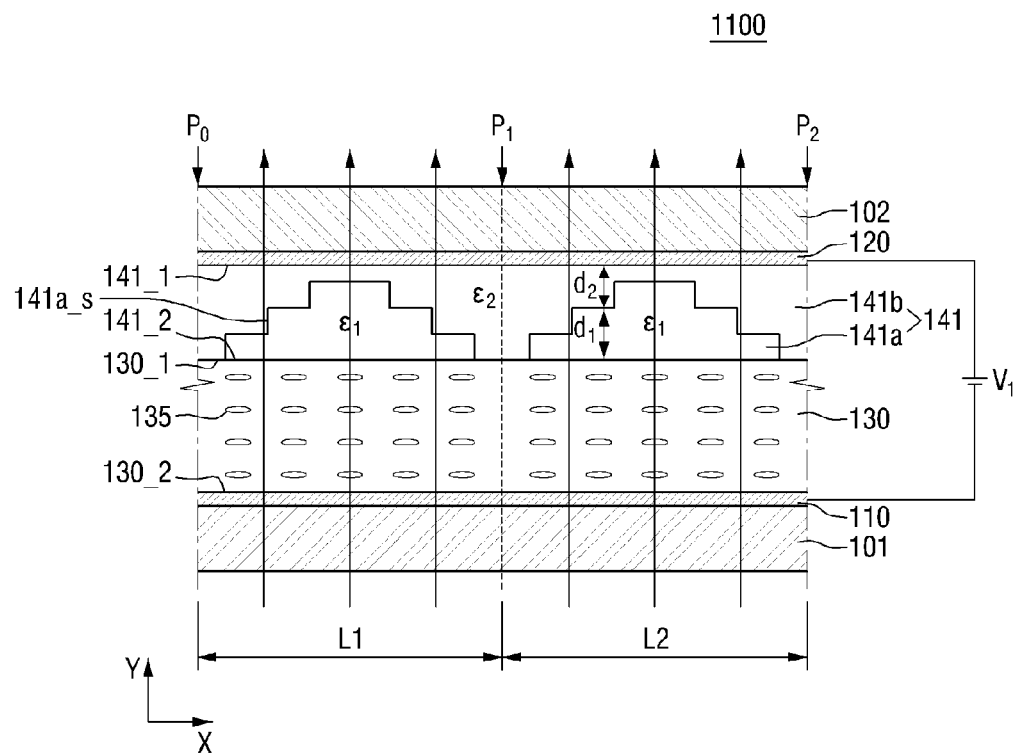
FIG. 4 is a schematic diagram illustrating the operation of the liquid crystal lens of FIG. 2 in a first mode.
Figure 5:
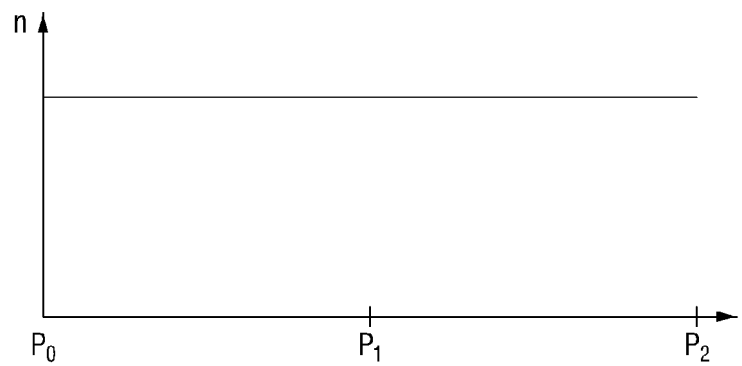
FIG. 5 is a graph illustrating the refractive index of a liquid crystal layer at each horizontal position when the liquid crystal lens of FIG. 2 is in the first mode.

The operation of the liquid crystal lens 1100 configured as described above will now be described. FIG. 4 is a schematic diagram illustrating the operation of the liquid crystal lens 1100 of FIG. 2 in the first mode. FIG. 5 is a graph illustrating the refractive index of the liquid crystal layer 130 at each horizontal position when the liquid crystal lens 1100 of FIG. 2 is in the first mode.

Referring to FIGS. 4 and 5, when the liquid crystal lens 1100 is in the first mode, the liquid crystal molecules 135 of the liquid crystal layer 130 are arranged at the same azimuth, irrespective of position in the horizontal direction X. In some embodiments, the first mode may be realized by applying the same voltage to the first electrode 110 and the second electrode 120. When the same voltage is applied to the first electrode 110 and the second electrode 120, a potential difference V1 applied to the dielectric layer 141 and the liquid crystal layer 130 is 0V. Since no voltage is applied to the liquid crystal layer 130, the liquid crystal molecules 135 remain aligned in the horizontal direction which is the initial alignment direction. Therefore, light incident on the liquid crystal lens 1100 feels the same refractive index irrespective of position in the horizontal direction of the liquid crystal layer 130 as shown in FIG. 5. Accordingly, the light incident on the liquid crystal layer 130 propagates straight within the liquid crystal layer 130 without changing its path.

When the light that passes through the liquid crystal layer 130 reaches the dielectric layer 141, if the refractive index of the dielectric layer 141 is the same as that of the liquid crystal layer 130, the light does not perceive the dielectric layer 141 as an optically different material. Therefore, the light transmits through the dielectric layer 141 without changing its path. Even when the refractive index of the liquid crystal layer 130 is different from that of the dielectric layer 141, most light that transmits through the liquid crystal layer 130 vertically does not change its path. Instead, the light simply changes its wavelength at an interface between the liquid crystal layer 130 and the dielectric layer 141 having different refractive indices. When the first dielectric sub-layer 141a has the same refractive index as the second dielectric sub-layer 141b, light does not change its path at the interface. Even when the refractive index of the first dielectric sub-layer 141a is different from the refractive index of the second dielectric sub-layer 141b, light incident on the interface vertically is not refracted. Therefore, as shown in FIG. 4, light incident on the liquid crystal lens 1100 passes through the liquid crystal layer 130 and the dielectric layer 141 without changing its path.

Figure 6:
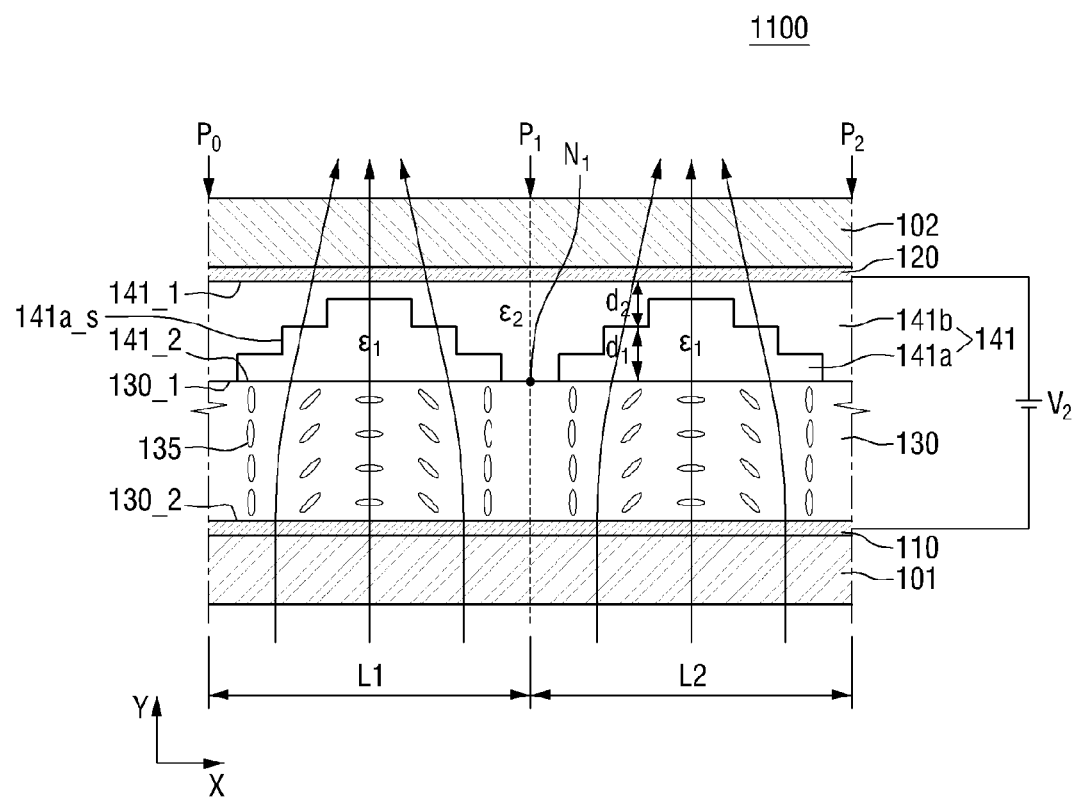
FIG. 6 is a schematic diagram illustrating the operation of the liquid crystal lens of FIG. 2 in a second mode.
Figure 7:
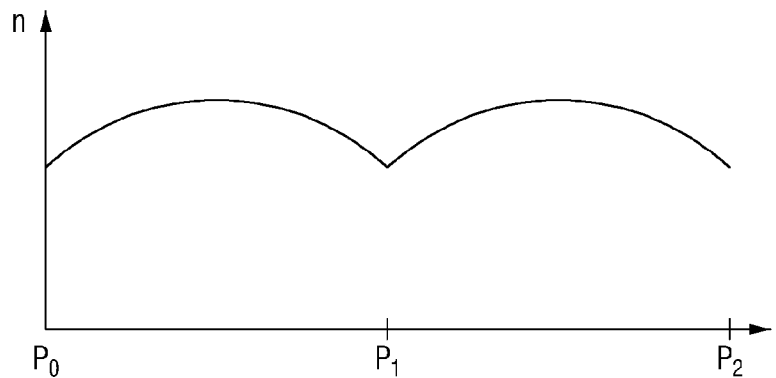
FIG. 7 is a graph illustrating the refractive index of the liquid crystal layer at each horizontal position when the liquid crystal lens of FIG. 2 is in the second mode.

FIG. 6 is a schematic diagram illustrating the operation of the liquid crystal lens 1100 of FIG. 2 in the second mode. FIG. 7 is a graph illustrating the refractive index of the liquid crystal layer 130 at each horizontal position when the liquid crystal lens 1100 of FIG. 2 is in the second mode.

Referring to FIGS. 6 and 7, when the liquid crystal lens 1100 is in the second mode, the liquid crystal molecules 135 of the liquid crystal layer 130 are arranged to have an at least partially different azimuth at each horizontal position. In some embodiments, the second mode may be realized by applying different voltages to the first electrode 110 and the second electrode 120 and forming an electric field between the first electrode 110 and the second electrode 120. In the second mode, the electric field between the top surface of the first electrode 110 and the bottom surface of the second electrode 120 is the same at each position in the horizontal direction X. However, from the perspective of the liquid crystal layer 130, the electric field between the top surface 130_1 and the bottom surface 130_2 of the liquid crystal layer 130 is different at each position in the horizontal direction X, more specifically, in each of the first through fifth flat sections f1 through f5 of the first dielectric sub-layer 141a.

The liquid crystal layer 130 and the dielectric layer 141 are interposed between the first electrode 110 and the second electrode 120. Since the bottom surface 130_2 of the liquid crystal layer 130 is adjacent to the first electrode 110, the first voltage may be applied to the bottom surface 130_2, irrespective of position in the horizontal direction X. In addition, the liquid crystal layer 130 is interposed between the top surface 130_1 of the liquid crystal layer 130 and the first electrode 110, and the dielectric layer 141 is interposed between the top surface 130_1 of the liquid crystal layer 130 and the second electrode 120.

The first capacitor having the first capacitance is formed between the top surface 130_1 and the bottom surface 130_2 of the liquid crystal layer 130. The second capacitor having the second capacitance is formed between the top surface 141_1 and the bottom surface 141_2 of the dielectric layer 141. The first capacitor is connected to the second capacitor in series on the equivalent circuit. Voltages applied to a plurality of capacitors in series are in inverse proportion to the capacitance of the respective capacitor and in proportion to the elastance of the respective capacitor.

Thus, a voltage between the first voltage applied to the first electrode 110 and the second voltage applied to the second electrode 120 may be applied to the top surface 130_1 of the liquid crystal layer 130, that is the bottom surface 141_2 of the dielectric layer 141. When the capacitance of the dielectric layer 141 is high, the difference between the voltage applied to the top surface 141_1 and the voltage applied to the bottom surface 141_2 of the dielectric layer 141 may be relatively small. Thus, the difference between the first voltage and the voltage applied to the top surface 130_1 of the liquid crystal layer 130 may be relatively large.

When the capacitance of the dielectric layer 141 is low, the difference between the first voltage and the voltage applied to the top surface 130_1 of the liquid crystal layer 130 may be relatively small.

As described above with reference to FIG. 3, the capacitance of the dielectric layer 141 is different in each of the first through fifth flat sections f1 through f5 in the horizontal direction X. Thus, the voltage applied to the top surface 130_1 of the liquid crystal layer 130 is also different in each of the first through fifth flat sections f1 through f5 in the horizontal direction X. In a section in which the dielectric layer 141 has high capacitance (low elastance), a voltage with a relatively large difference from the first voltage is applied to the top surface 130_1. The magnitude of the electric field applied to the top and bottom surfaces 130_1 and 130_2 of the liquid crystal layer 130 increases. In a section in which the dielectric layer 141 has low capacitance (high elastance), a relatively small difference from the first voltage is applied to the top surface 130_1. Therefore, the magnitude of the electric field applied to the top and bottom surfaces 130_1 and 130_2 of the liquid crystal layer 130 decreases.

As described above, in embodiments where the liquid crystal molecules 135 have positive dielectric anisotropy, a larger electric field causes the liquid crystal molecules 135 to be rotated more in the direction of the electric field. Therefore, the liquid crystal molecules 135 are rotated more in the vertical direction in a section in which the capacitance of the dielectric layer 141 is high and are rotated relatively less in a section in which the capacitance of the dielectric layer 141 is low.

Figure 8A:
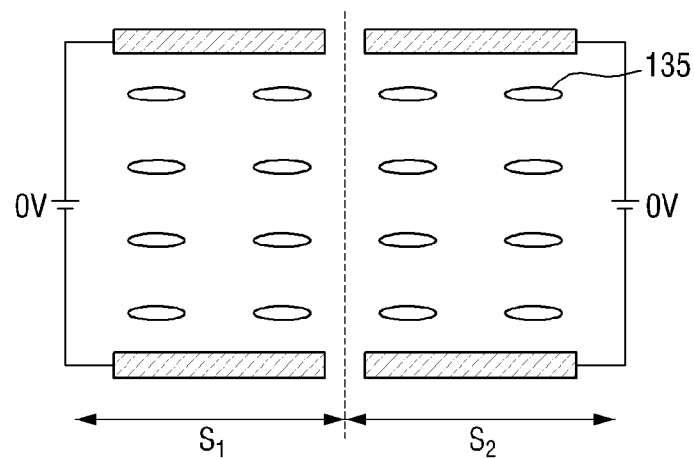
FIGS. 8A and 8B are conceptual diagrams illustrating the effect of neighboring liquid crystal molecules on an azimuth of current liquid crystal molecules.
Figure 8B:
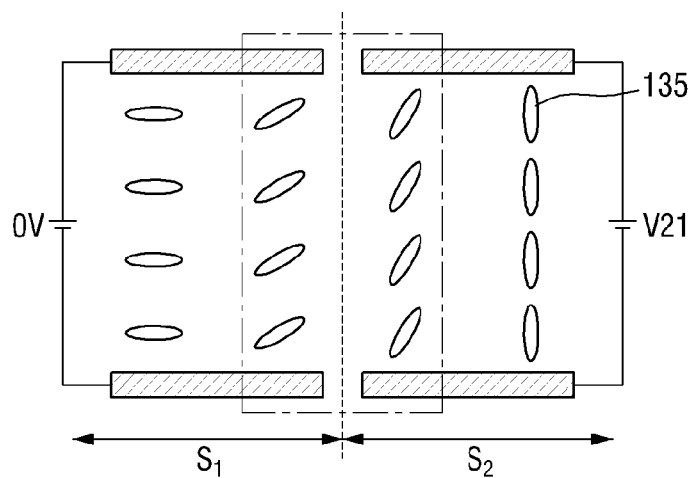

In one flat section, the height d1 of the first dielectric sub-layer 141a is constant regardless of horizontal position. Thus, the electric field applied to the top and bottom surfaces 130_1 and 130_2 of the liquid crystal layer 130 is also constant. Accordingly, the electric field of the liquid crystal layer 130 may cause the liquid crystal molecules 135 to have the same azimuth over the entire flat section. However, the azimuth of the liquid crystal molecules 135 may be affected not only by the electric field of the liquid crystal layer 130 but also by an azimuth of neighboring liquid crystal molecules 135 or a neighboring electric field. A more detailed description will be made with reference to FIGS. 8A and 8B. FIGS. 8A and 8B are conceptual diagrams illustrating the effect of neighboring liquid crystal molecules on an azimuth of current liquid crystal molecules.

Referring to FIG. 8A, a liquid crystal layer may be divided into a first section S1 and a second section S2 which neighbor each other, and different voltages may be applied to the first section S1 and the second section S2, respectively. In such embodiments, if a voltage of 0 V is applied to both the first section S1 and the second section S2, liquid crystal molecules 135 may not rotate, but instead may maintain their original horizontal orientation.

Referring to FIG. 8B, a voltage of 0 V may be applied to the first section S1, and a voltage V21, of a magnitude that can vertically rotate the liquid crystal molecules 135, may be applied to the second section S2. In such embodiments, the liquid crystal molecules 135 of the first section S1 may maintain their original azimuth of 0 degrees due to an applied electric field, and the liquid crystal molecules 135 of the second section S2 may be rotated at an azimuth of 90 degrees. However, the actual behavior of the liquid crystal molecules 135 is affected not only by an applied voltage, but also by the rotation of neighboring liquid crystal molecules 135. In particular, although liquid crystal molecules 135 of the first section S1 which are located at a boundary between the first section S1 and the second section S2 are forced to have an azimuth of 0 degrees by the electric field, since the liquid crystal molecules 135 of the adjacent second section S2 are rotated 90 degrees, the liquid crystal molecules 135 of the first section S1 at the boundary may also be rotated by the rotation of the liquid crystal molecules 135 of the second section S2. When rotated by the electric field, liquid crystal molecules 135 of the second section S2 which are located at the boundary between the first section S1 and the second section S2 may provide some of their rotary power to the liquid crystal molecules 135 of the first section S1. Thus, the actual angle at which the liquid crystal molecules 135 of the second section S2 at the boundary are rotated may be smaller than 90 degrees.

In this way, although an electric field applied directly to the liquid crystal molecules 135 changes sharply in a staircase manner, since the azimuth of the liquid crystal molecules 135 is affected by the rotation of neighboring liquid crystal molecules 135, it may change gently. This phenomenon may also occur due to the effect of a neighboring electric field. That is, a voltage applied to the first section S1 may partially affect the neighboring second section S2, causing an extreme change in electric field to become gentle.

Referring back to FIG. 6, not all of the liquid crystal molecules 135 located in one flat section have the same azimuth for the reasons described above with reference to FIG. 8B. The azimuth of the liquid crystal molecules 135 may be changed gently by an azimuth of neighboring liquid crystal molecules 135 or a neighboring electric field.

The liquid crystal molecules 135 have anisotropy for refractive index. That is, the liquid crystal molecules 135 have two types of refractive indices, an ordinary ray refractive index $n_o$ for light in an optically long-axis direction and an extraordinary ray refractive index $n_e$ for light in a short-axis direction. The ordinary ray refractive index $n_o$ may be smaller than the extraordinary ray refractive index $n_e$. The ordinary ray refractive index $n_o$ of the liquid crystal molecules 135 may be, for example, about 1.5, and the extraordinary ray refractive index $n_e$ of the liquid crystal molecules 135 may be, for example, about 1.7.

Therefore, when the liquid crystal molecules 135 are arranged horizontally, light feels the extraordinary ray refractive index $n_e$, and thus the refractive index becomes relatively high. When the liquid crystal molecules 135 are rotated vertically, light feels a relatively smaller ordinary ray refractive index $n_o$, and thus the refractive index becomes relatively low. Therefore, the refractive index of the liquid crystal layer 130 (in which the liquid crystal molecules 135 have azimuths arranged as shown in FIG. 6) at each position in the horizontal direction X may be distributed as shown in FIG. 7 (a curve convex upward).

Light propagates straight within a material having a uniform refractive index. However, in a gradient index (GRIN) lens structure in which the refractive index gradually changes within a material as shown in FIG. 7, the path of light bends from a medium having a low refractive index to a medium having a high refractive index. The structure and operating principle of the GRIN lens are disclosed in U.S. Pat. No. 5,790,314, the content of which is hereby incorporated by reference.

In the second mode, the path of light that passes through the liquid crystal layer 130 bends toward a medium having a high refractive index as shown in FIG. 6. The modulated path of light shown in FIG. 6 is similar to the path of light that passes through a convex lens. That is, in the second mode, the liquid crystal layer 130 of the liquid crystal lens 1100 can concentrate light without using a convex lens.

Light that passes through the liquid crystal layer 130 reaches an interface of the dielectric layer 141 and the liquid crystal layer 130. The light that bends as it passes through the liquid crystal layer 130 enters the dielectric layer 141 at a certain angle of incidence. When the dielectric layer 141 has substantially the same refractive index as the liquid crystal layer 130, the light propagates without changing its path. When the dielectric layer 141 and the liquid crystal layer 130 have different refractive indices, the light is refracted at the interface. If the refractive index of the dielectric layer 141 is lower than that of the liquid crystal layer 130, the light may be refracted at a greater angle than the angle of incidence according to Snell's law and thus be brought to a focus in a shorter distance. Conversely, if the refractive index of the dielectric layer 141 is higher than that of the liquid crystal layer 130, the opposite occurs.

The path of light in the dielectric layer 141 may be similar to that in the liquid crystal layer 130. That is, when the first dielectric sub-layer 141a has substantially the same refractive index as the second dielectric sub-layer 141b, the light is not refracted at the interface between the first dielectric sub-layer 141a and the second dielectric sub-layer 141b. When the refractive index of the first dielectric sub-layer 141a is different from that of the second dielectric sub-layer 141b the light may be refracted at the interface according to Snell's law. If the interface between the first dielectric sub-layer 141a and the second dielectric sub-layer 141b is flat, it may be easy to predict and control the refraction angle regardless of the horizontal position. Therefore, even if the refractive index of the first dielectric sub-layer 141a is different from that of the second dielectric sub-layer 141b, the concentration of the light may be controlled easily.

The magnitudes of the first voltage and the second voltage not only determine the first mode or the second mode, but also control light modulation characteristics differently even in the same second mode. As described above, when the same voltage is applied to the first electrode 110 and the second electrode 120, the liquid crystal lens 110 is driven in the first mode. Even when the difference between the first voltage and the second voltage is very large, the liquid crystal lens 1100 can be driven in the first mode. In an extreme example, if the difference between the first voltage and the second voltage is infinite, even when the voltage applied to the top surface 130_1 of the liquid crystal layer 130 differs from position to position in the horizontal direction X, since an absolute value of the difference between the voltage of the top surface 130_1 of the liquid crystal layer 130 and the voltage of the bottom surface 130_2 of the liquid crystal layer 130 is very large, all of the liquid crystal molecules 135 may rotate vertically. That is, since all liquid crystal molecules 135 of the liquid crystal layer 130 have the same azimuth of 90 degrees, the light that passes through the liquid crystal layer 130 may feel the ordinary ray refractive index $n_o$, irrespective of position in the horizontal direction. In this case, the GRIN lens may not be formed, and thus light may proceed straight without bending within the liquid crystal layer 130.

Although the first voltage and the second voltage have different values, if the difference between the values is small enough to make a maximum value of the electric field applied to the top surface 130_1 and the bottom surface 130_2 of the liquid crystal layer 130 not exceed a value of a threshold electric field for rotating the liquid crystal molecules 135, all of the liquid crystal molecules 130 may remain aligned horizontally. Therefore, the GRIN lens may not be formed, and light may proceed straight without bending within the liquid crystal layer 130.

As apparent from the above description, the liquid crystal lens 1100 can be driven in the second mode only when the first voltage and the second voltage are different, and when the difference between the first voltage and the second voltage is within a predetermined range. That is, the maximum value of the electric field applied to the top and bottom surfaces 130_1 and 130_2 of the liquid crystal layer 130 by the difference between the first voltage and the second voltage should be higher than the value of the threshold electric field for rotating the liquid crystal molecules 135. Also, a minimum value of the electric field applied to the top and bottom surfaces 130_1 and 130_2 of the liquid crystal layer 130 by the difference between the first voltage and the second voltage should be lower than the value of the electric field for vertically rotating the liquid crystal molecules 135.

Even when the liquid crystal lens 1100 is driven in the second mode, the refractive index distribution may vary according to the difference between the first voltage and the second voltage. That is, the difference between the first voltage and the second voltage controls the curvature of the GRIN lens shown in FIG. 7 in various ways. Accordingly, it is obvious that the focal length of the GRIN lens can be adjusted differently.

Those of ordinary skill in the art can easily implement detailed conditions for driving the liquid crystal lens 1100 in the first mode or the second mode and a method of controlling a focal length in the second mode by appropriately adjusting the first voltage and the second voltage according to the dielectric constant of a dielectric substance and the type of the liquid crystal molecules 135 with reference to the above-disclosed information.

While a case where $\in_2$ is greater than $\in_1$ has been described above, $\in_2$ may be lower than $\in_1$ with the same structure. In this case, the following equation 4 may be established from equation 2.

$$1/C=(d_1\in_2+d_2\in_1)/\in_1\in_2S=\{(\in_1-\in_2)d_2+D\in_2\}/\in_1\in_2S \qquad (4).$$

Since $\in_1$, $\in_2$, D and S can all be treated as constants in Equation (4), the capacitance C and the elastance 1/C of the dielectric layer 141 may vary according to the height d2 of the second dielectric sub-layer 141b. When $\in_1$ is greater than $\in_2$, ($\in_1-\in_2$) is a positive number. Thus, the elastance 1/C of the dielectric layer 141 increases as the height d2 of the second dielectric sub-layer 141b increases. The height d1 of the first dielectric sub-layer 141a decreases as the height d2 of the second dielectric sub-layer 141b increases, because the sum of d1 and d2 is a constant from equation (1). Therefore, the elastance 1/C of the dielectric layer 141 increases as the height d1 of the first dielectric sub-layer 141a decreases.

Thus, if $\in_2$ is greater than $\in_1$, a graph of elastance 1/C of the dielectric layer 141 may have similar patterns to the horizontal symmetry of the graph shown in FIG. 3. Accordingly, electrical field applied to the liquid crystal layer 130 may be changed and the liquid lens may exhibit optical characteristics similar to those of a concave lens.

While a case where the liquid crystal lens 1100 has two unit lens sections L1 and L2 has been described above, it is obvious that the liquid crystal lens 1100 can have two or more unit lens sections. This is illustrated in the following embodiments.

Hereinafter, various embodiments of liquid crystal lenses will be described.

In some embodiments, liquid crystal lenses may have different light modulation characteristics in a first unit lens section and a second unit lens section. The liquid crystal lenses having such characteristics are shown in FIGS. 9 through 11.

Figure 9:
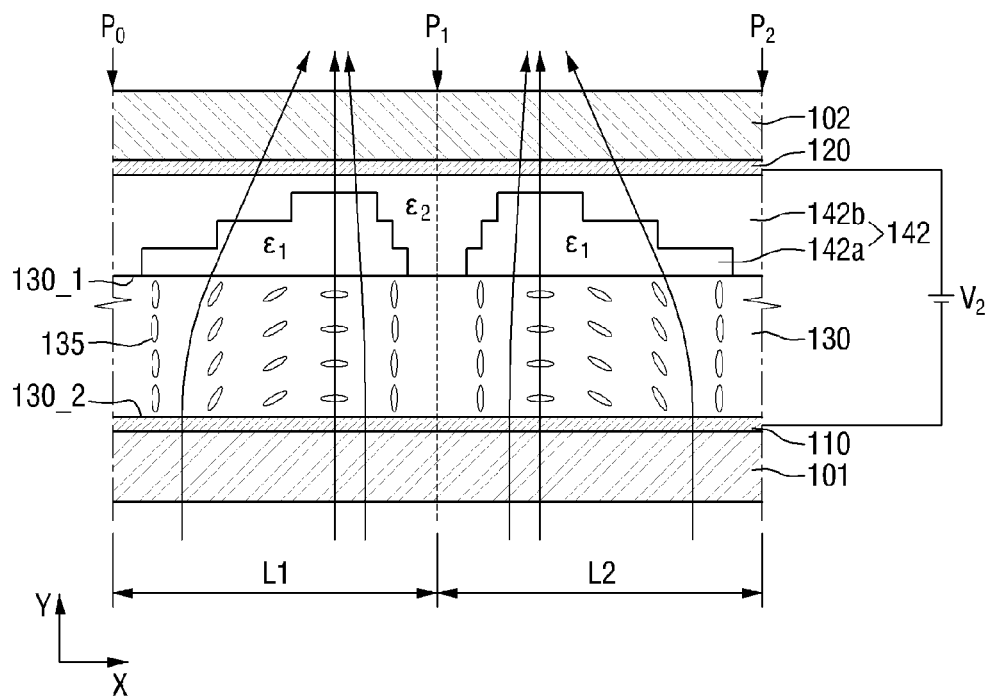
FIG. 9 is a cross-sectional view of an embodiment of a liquid crystal lens.
Figure 10:
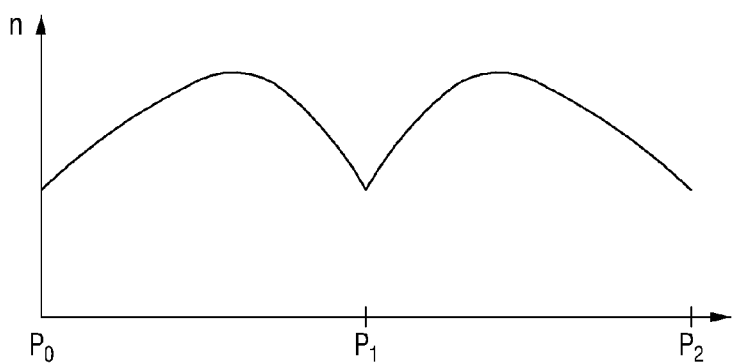
FIG. 10 is a graph illustrating the refractive index of the liquid crystal layer at each horizontal position when the liquid crystal lens of FIG. 9 is in the second mode.

FIG. 9 is a cross-sectional view of another embodiment of a liquid crystal lens 1101. FIG. 10 is a graph illustrating the refractive index of the liquid crystal layer at each horizontal position when the liquid crystal lens of FIG. 9 is in the second mode. Referring to FIGS. 9 and 10, the dielectric layer 142 of the liquid crystal lens 1101 according to the current exemplary embodiment includes a first dielectric sub-layer 142a and a second dielectric sub-layer 142b. A horizontal position of a flat section in which the first dielectric sub-layer 142a of a first unit lens section L1 has a maximum height is different from a horizontal position of a flat section in which the first dielectric sub-layer 142a of a second unit lens section L2 has a maximum height. In the first unit lens section L1, a flat section in which the first dielectric sub-layer 142a has a maximum height is generally located to the right of a midpoint between a position P0 and a position P1. On the other hand, in the second unit lens section L2, a flat section in which the first dielectric sub-layer 142a has a maximum height is generally located to the left of a midpoint between the position P1 and a position P2. Therefore, the refractive index of the liquid crystal layer 130 at each horizontal may have similar patterns to the graph shown in FIG. 10. Accordingly, as shown in FIG. 9, an optical path in the first unit lens section L1 slants toward the right compared with the optical path shown in FIG. 6, whereas an optical path in the second unit lens section L2 slants relatively toward the left.

Figure 11:
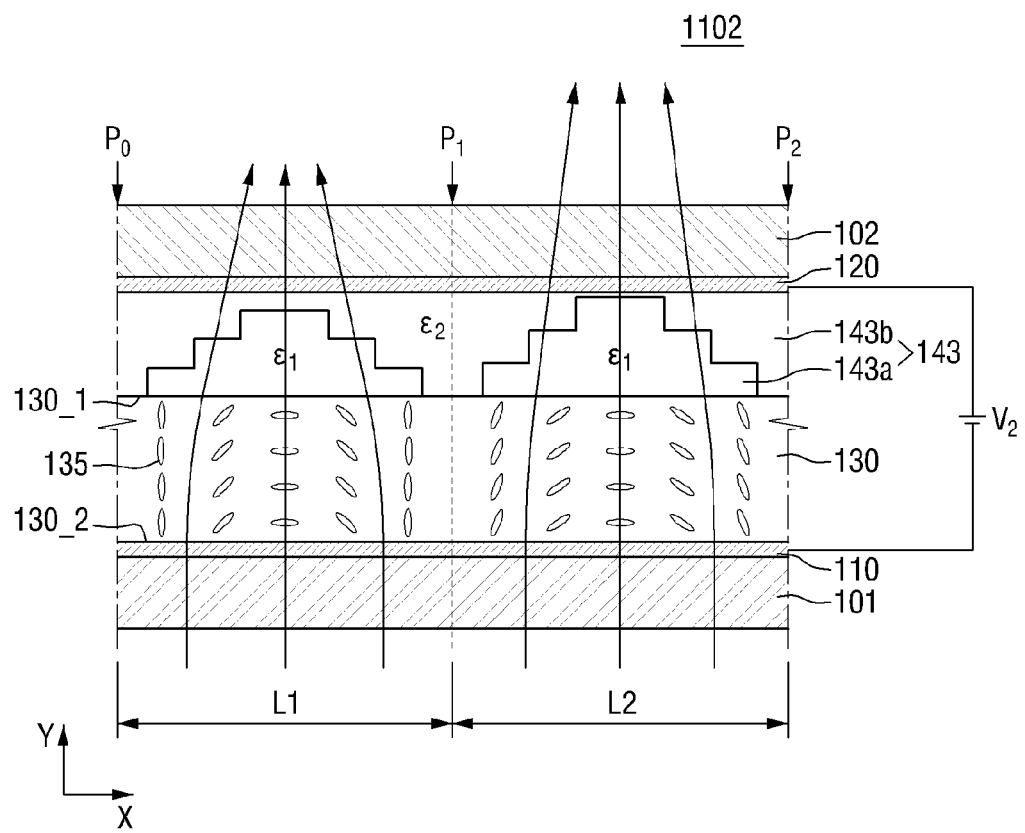
FIG. 11 is a cross-sectional view of an embodiment of a liquid crystal lens.
Figure 12:
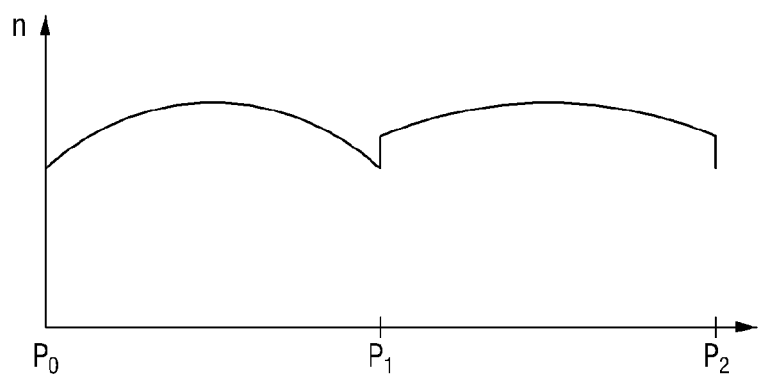
FIG. 12 is a graph illustrating the refractive index of the liquid crystal layer at each horizontal position when the liquid crystal lens of FIG. 11 is in the second mode.

FIG. 11 is a cross-sectional view of another embodiment of a liquid crystal lens 1102. FIG. 12 is a graph illustrating the refractive index of the liquid crystal layer at each horizontal position when the liquid crystal lens of FIG. 11 is in the second mode. Referring to FIGS. 11 and 12, the dielectric layer 143 of the liquid crystal lens 1102 includes a first dielectric sub-layer 143a and a second dielectric sub-layer 143b. A maximum height value of the first dielectric sub-layer 143a in a first unit lens section L1 is different from the maximum height value of the first dielectric sub-layer 143a in a second unit lens section L2. Accordingly, as shown in FIG. 12, the horizontal variation in an electric field applied to top and bottom surfaces 130_1 and 130_2 of a liquid crystal layer 130 is greater in the first unit lens section L1 than in the second unit lens section L2. Accordingly, as shown in FIG. 11, when the liquid crystal lens 1102 is driven in a second mode, an azimuth of liquid crystal molecules 135 changes more significantly in the first unit lens section L1 along a horizontal direction, and the variation in the refractive index of the liquid crystal molecules 135 is greater in the first unit lens section L1. This may cause an optical path to be bent more in the first unit lens section L1 than in the second unit lens section L2. Consequently, an optical focal length may be shorter in the first unit lens section L1 than in the second unit lens section L2.

Figure 13:
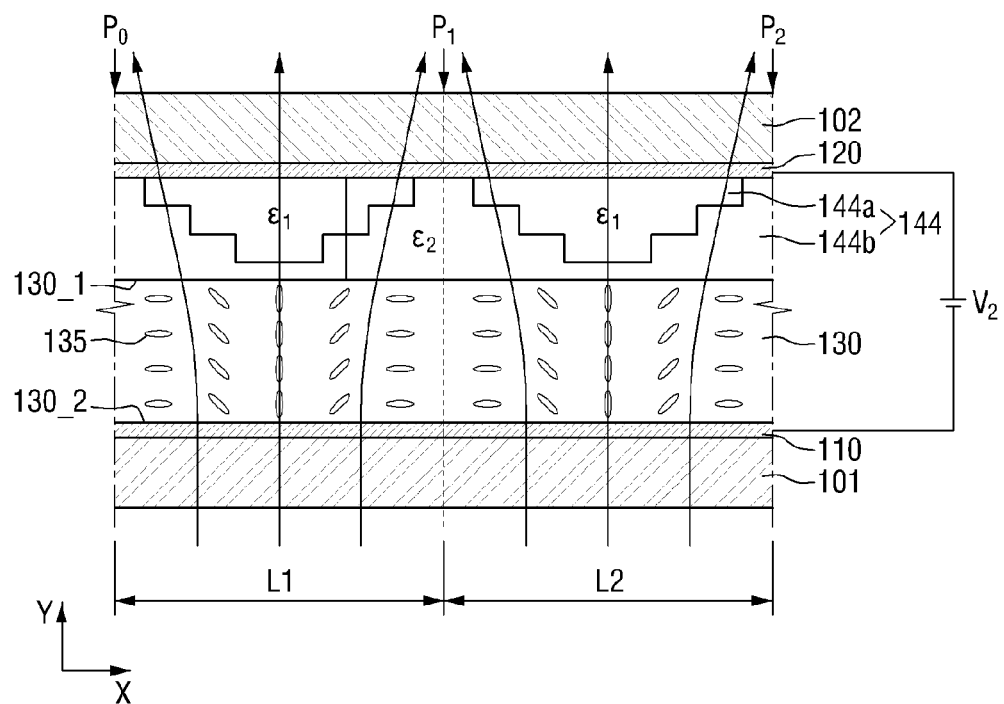
FIG. 13 is a cross-sectional view of an embodiment of a liquid crystal lens.
Figure 14:
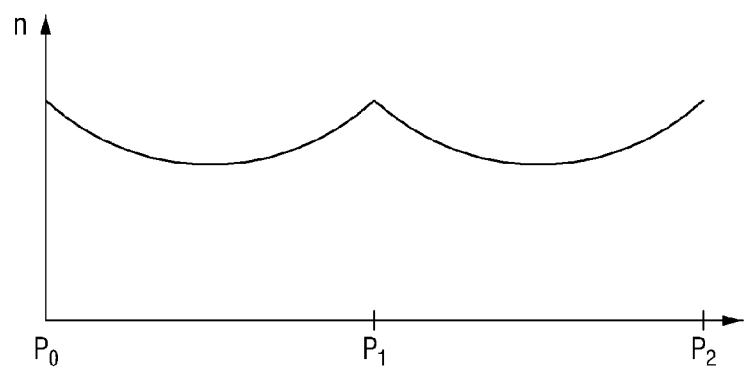
FIG. 14 is a graph illustrating the refractive index of the liquid crystal layer at each horizontal position when the liquid crystal lens of FIG. 13 is in the second mode.

FIG. 13 is a cross-sectional view of another embodiment of a liquid crystal lens 1103. FIG. 14 is a graph illustrating the refractive index of the liquid crystal layer at each horizontal position when the liquid crystal lens of FIG. 13 is in the second mode. Referring to FIGS. 13 and 14, the dielectric layer 144 of the liquid crystal lens 1103 includes a first dielectric sub-layer 144a and a second dielectric sub-layer 144b. The liquid crystal lens 1103 is different from the liquid crystal lens 1100 of FIG. 2 in that the first dielectric sub-layer 144a is placed on the second dielectric sub-layer 144b and $\in_1$ is greater than $\in_2$. Therefore, the elastance 1/C between top and bottom surfaces of the dielectric layer 144 in a first unit lens section L1 decreases and then increases in a direction from a position P0 to a position P1. The refractive index of the liquid crystal layer at each horizontal position when the liquid crystal lens is in the second mode forms a parabolic curve that bulges downward as shown in FIG. 14. In a second unit lens section L2, the elastance 1/C of the dielectric layer 144 forms the same parabolic curve as that of the first unit lens section L1. As described above, an optical path bends from a medium with a low refractive index to a medium with a high refractive index in the GRIN lens structure. Therefore, in a second mode, a liquid crystal layer 130 of FIG. 13 modulates the optical path in a similar way as a concave lens. In the second mode, the liquid crystal layer 130 of the liquid crystal lens 1103 can diverge or spread light without using a concave lens.

Figure 15:
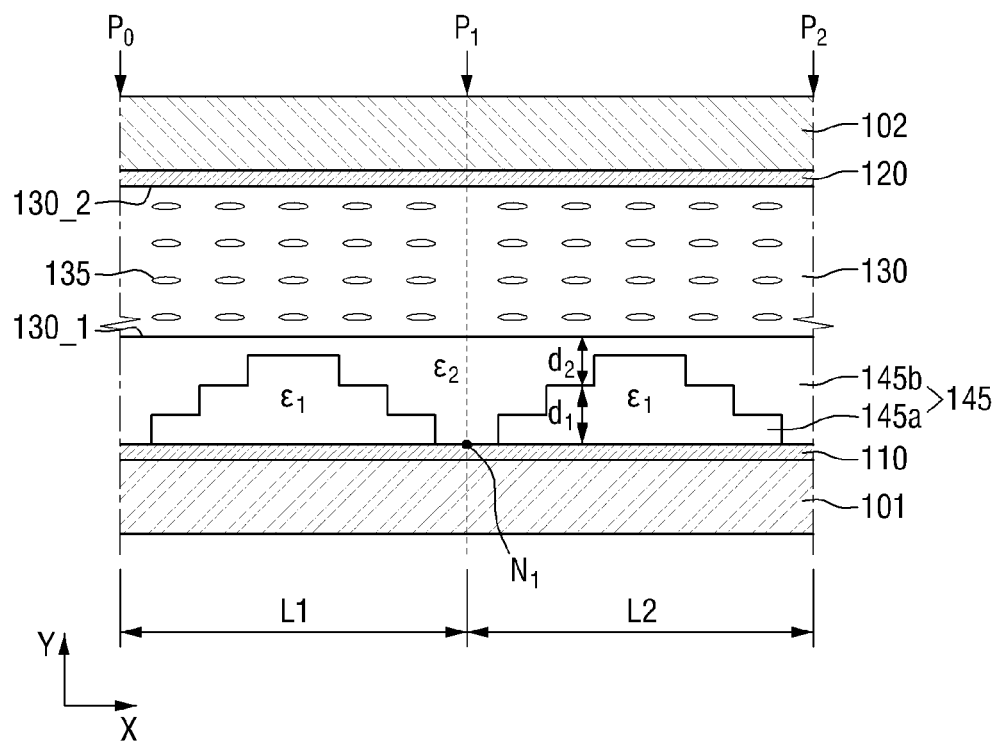
FIGS. 15 through 29 are cross-sectional views of various embodiments of liquid crystal lenses.

FIG. 15 is a cross-sectional view of another embodiment of a liquid crystal lens 1104. The embodiment of FIG. 15 shows that an order in which a liquid crystal layer 130 and a dielectric layer 145 are stacked can be reversed. That is, unlike in the liquid crystal lens 1100 of FIG. 2, in the liquid crystal lens 1104, the dielectric layer 145, which includes a first dielectric sub-layer 145a and a second dielectric sub-layer 145, is disposed under the liquid crystal layer 130. Reversing the order in which the liquid crystal layer 130 and the dielectric layer 145 are stacked has no influence on an electric field applied to the liquid crystal layer 130. Therefore, the embodiment of FIG. 15 may exhibit substantially the same elastance 1/C distribution as the embodiment of FIG. 2. Accordingly, an azimuth of liquid crystal molecules 135 in a second mode may be maintained substantially the same as that of the liquid crystal molecules 135 in the embodiment of FIG. 2.

In the embodiment of FIG. 15, since light emitted from below passes through the dielectric layer 145 before the liquid crystal layer 130, even when the first dielectric sub-layer 145a and the second dielectric sub-layer 145b have different refractive indices, the vertically incident light proceeds straight within the dielectric layer 145 without changing its path. Therefore, the path of the light can be controlled by adjusting only the azimuth of the liquid crystal molecules 135 and is not affected by the refractive index of the dielectric layer 145.

Figure 16:
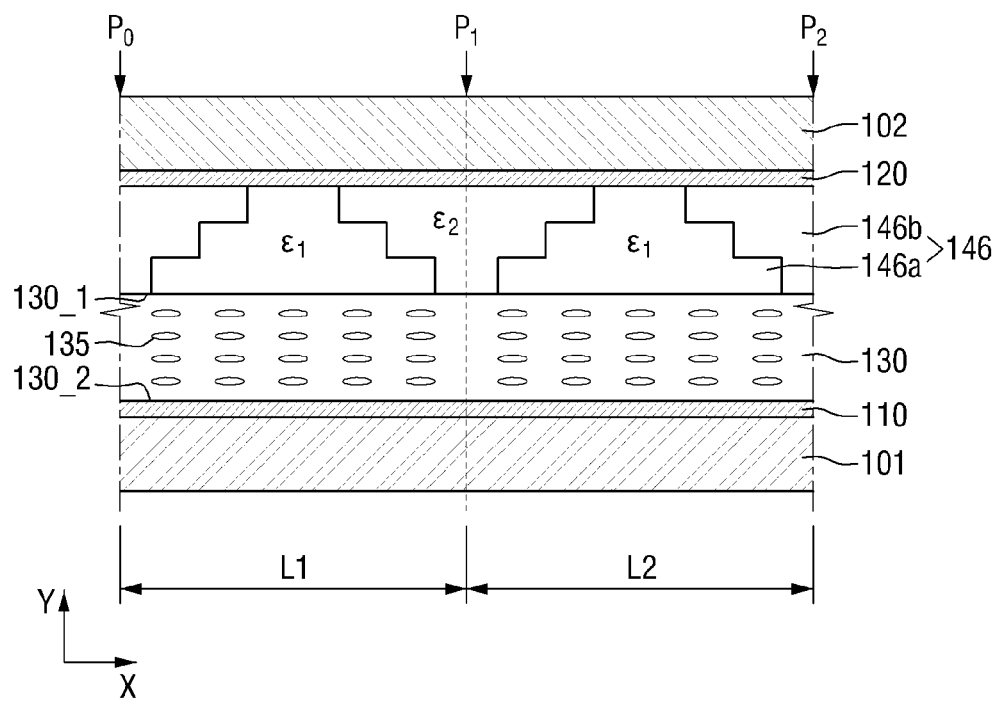

FIG. 16 is a cross-sectional view of another embodiment of a liquid crystal lens 1105. Referring to FIG. 16, the liquid crystal lens 1105 is different from the liquid crystal lens 1100 of FIG. 2 in that part of a top surface of a first dielectric sub-layer 146a forms a top surface of a dielectric layer 146. In this structure, a top surface of a second dielectric sub-layer 146b is flat but is partially interrupted by flat regions of the top surface of the first dielectric sub-layer 146a. Although the dielectric layer 145 is configured as described above, it has different elastance 1/C in each flat section. Thus, the dielectric layer 145 may show substantially the same elastance 1/C distribution as that of the dielectric layer 141 according to the embodiment of FIG. 2. Accordingly, since a GRIN lens structure is formed, the liquid crystal lens 1105 may exhibit optical characteristics similar to those of a convex lens.

Figure 17:
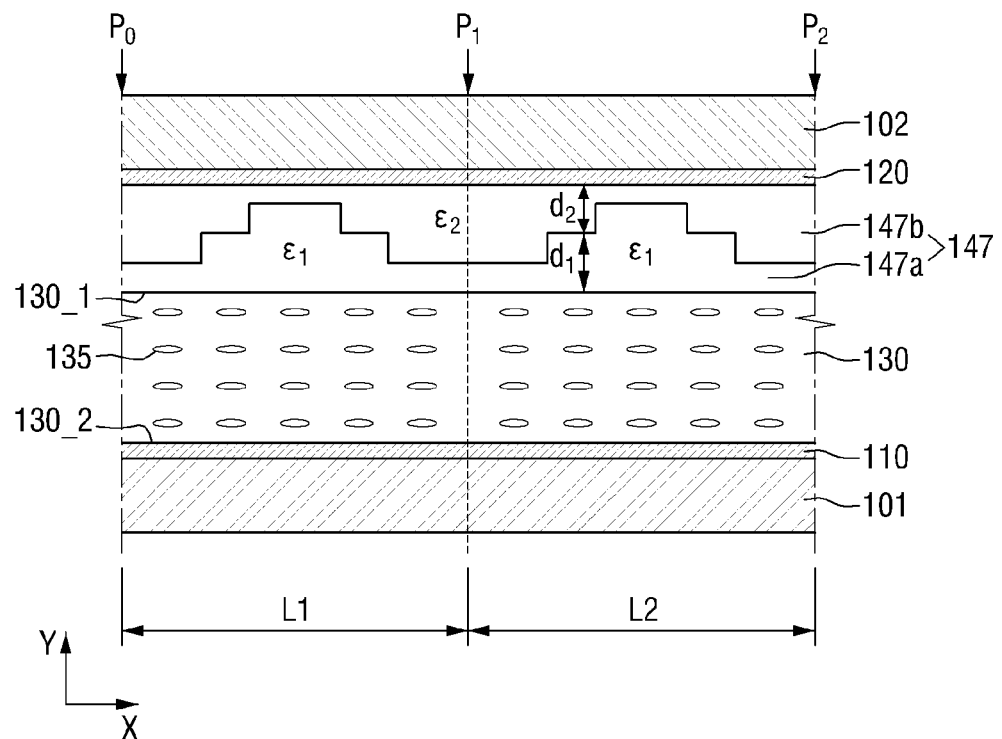

FIG. 17 is a cross-sectional view of another embodiment of a liquid crystal lens 1106. Referring to FIG. 17, the liquid crystal lens 1106 is different from the liquid crystal lens 1100 of FIG. 2 in that unit patterns of a first dielectric sub-layer 147a are not separated but are connected to each other. Although the dielectric layer 147 is configured as described above, it has different elastance 1/C in each flat section. Thus, the dielectric layer 147 may show substantially the same elastance 1/C distribution as that of the dielectric layer 141 according to the embodiment of FIG. 2. Accordingly, since a GRIN lens structure is formed, the liquid crystal lens 1106 may exhibit optical characteristics similar to those of a convex lens. Reference numeral 147b indicates a second dielectric sub-layer.

Figure 18:
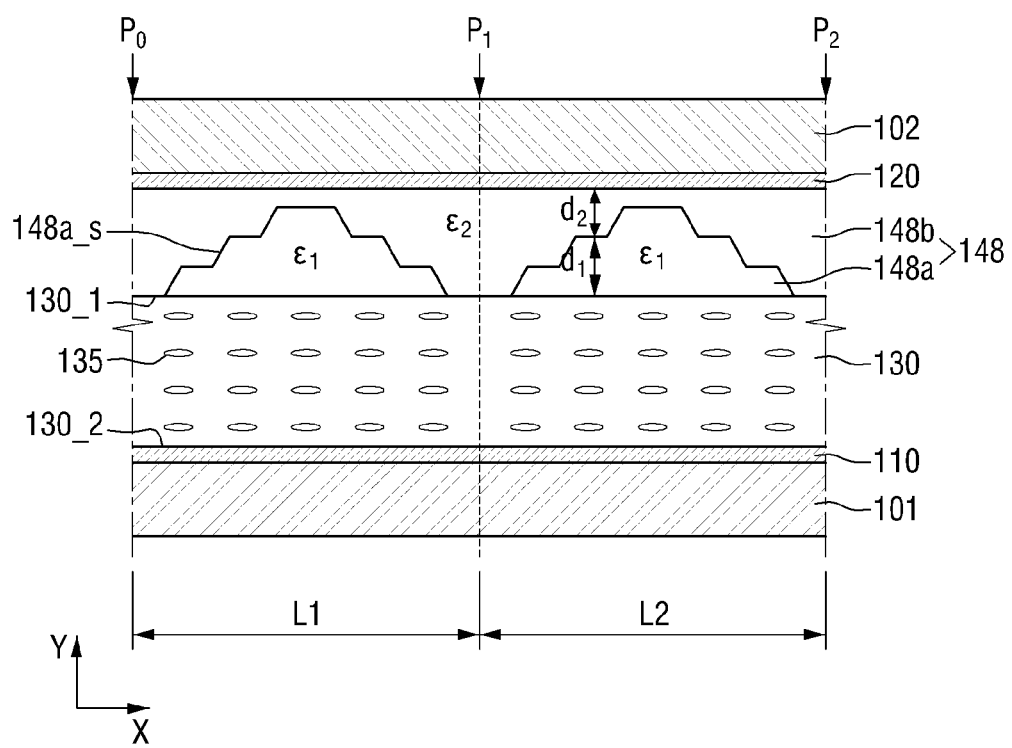

FIG. 18 is a cross-sectional view of another embodiment of a liquid crystal lens 1107. Referring to FIG. 18, the liquid crystal lens 1107 is different from the liquid crystal lens 1100 of FIG. 2 in that neighboring flat sections of a first dielectric sub-layer 148a are not connected by a sidewall but by a diagonal section 148a_s. The diagonal section 148a_s that replaces the sidewall may cause the change in elastance 1/C to become gentler. Therefore, a more effective GRIN lens structure can be formed. Reference numeral 148b indicates a second dielectric sub-layer.

Figure 19:
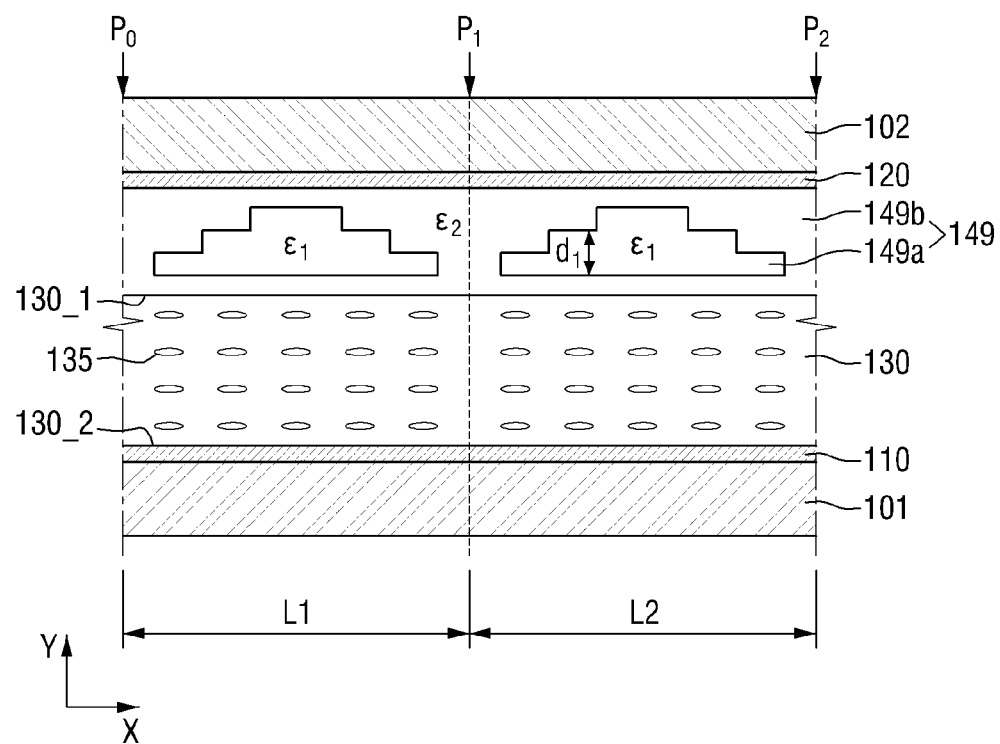

FIG. 19 is a cross-sectional view of another embodiment of a liquid crystal lens 1108. Referring to FIG. 19, a first dielectric sub-layer 149a of the liquid crystal lens 1108 is the same as that of the liquid crystal lens 1100 of FIG. 2. However, the liquid crystal lenses 1108 and 1100 are different in that the first dielectric sub-layer 149a is buried in a second dielectric sub-layer 149b. Although the positions of the first dielectric sub-layers 149a and 141a are different, a height d1 of the first dielectric sub-layer 149a is equal to the height d1 of the first dielectric sub-layer 141a of FIG. 2 in a section which includes the first dielectric sub-layer 149a or 141a. In this section, the sum of heights of the second dielectric sub-layer 149b is equal to the height d2 of the second dielectric sub-layer 141b of FIG. 2. Thus, the total dielectric constant and elastance 1/C of a dielectric layer 149 are substantially the same as those of the dielectric layer 141 according to the embodiment of FIG. 2. Accordingly, it can be easily understood that the dielectric layer 149 operates in the same way as the dielectric layer 141 of FIG. 2.

Figure 20:
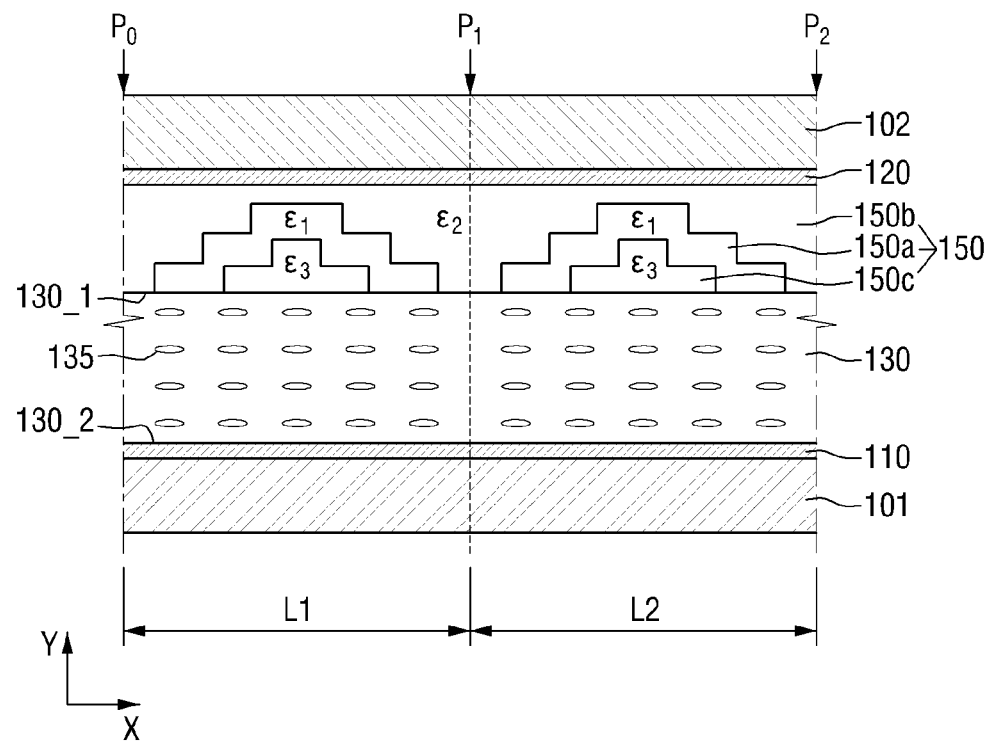

FIG. 20 is a cross-sectional view of another embodiment of a liquid crystal lens 1109. Referring to FIG. 20, the liquid crystal lens 1109 is different from the liquid crystal lens 1100 of FIG. 2 in that a first dielectric sub-layer 150a covers a third dielectric sub-layer 150c. Therefore, a dielectric layer 150 includes not only a section which includes the first dielectric sub-layer 150a and a second dielectric sub-layer 150b but also a section which includes first through third dielectric sub-layers 150a through 150c. In the latter section, a dielectric constant of the dielectric layer 150 is determined by the dielectric constants and heights of the three dielectric sub-layers 150a through 150c.

As described above, an increase in the number of dielectric sub-layers enables various combinations of dielectric constants, thus contributing to the fine tuning of the dielectric constant distribution of the dielectric layer 150.

Figure 21:
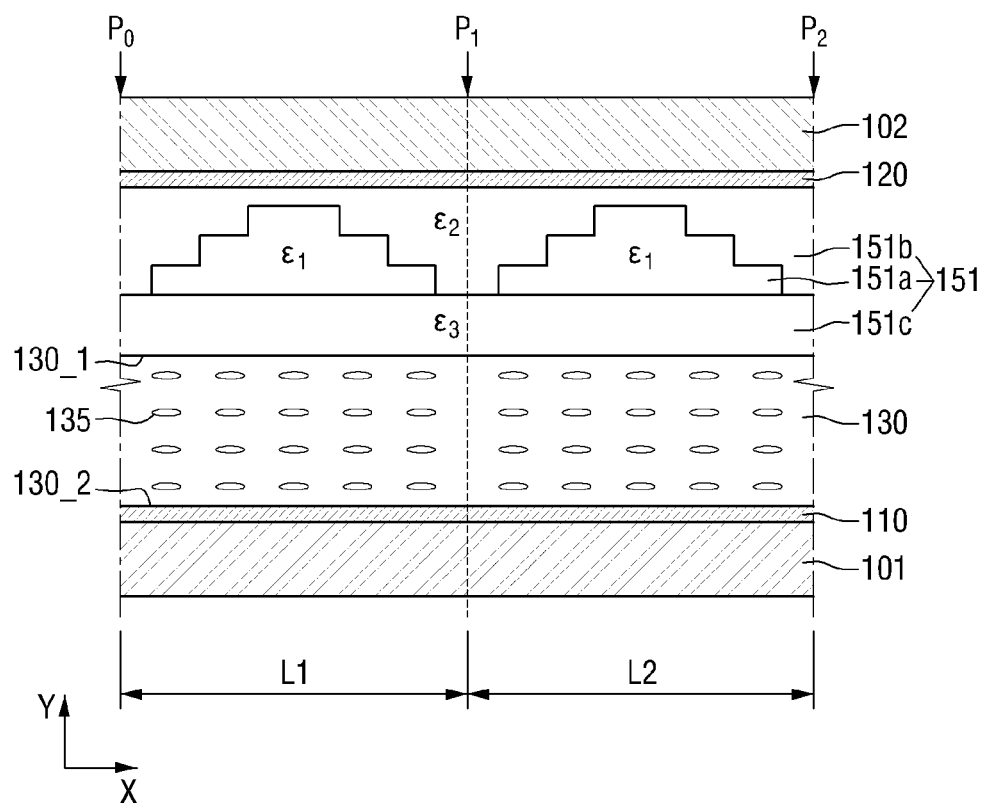

FIG. 21 is a cross-sectional view of another embodiment of a liquid crystal lens 1110. Referring to FIG. 21, the shapes and relative positions of a first dielectric sub-layer 151a and a second dielectric sub-layer 151b included in the liquid crystal lens 1110 are substantially the same as those of the first dielectric sub-layer 141a and the second dielectric sub-layer 141b included in the liquid crystal lens 1100 of FIG. 2. However, the liquid crystal lenses 1110 and 1100 are different in that a third dielectric sub-layer 150c having top and bottom surfaces which are flat and parallel to each other is provided under the first dielectric sub-layer 151a and the second dielectric sub-layer 151b.

The total elastance 1/C distribution of a dielectric layer 151 in a horizontal direction is affected not only by the dielectric constants and heights of the first dielectric sub-layer 151a and the second dielectric sub-layer 151b but also by the dielectric constant and height of the third dielectric sub-layer 151c. The substantial elastance 1/C distribution of the dielectric layer 151 at each horizontal position may be similar to that of the dielectric layer 141 shown in FIG. 3. In the embodiment of FIG. 21, the third dielectric sub-layer 151c is formed under the first dielectric sub-layer 151a and the second dielectric sub-layer 151b. However, the third dielectric sub-layer 151c can also be stacked on the first dielectric sub-layer 151a and the second dielectric sub-layer 151b or can be stacked on and under the first dielectric sub-layer 151a and the second dielectric sub-layer 151b.

Figure 22:
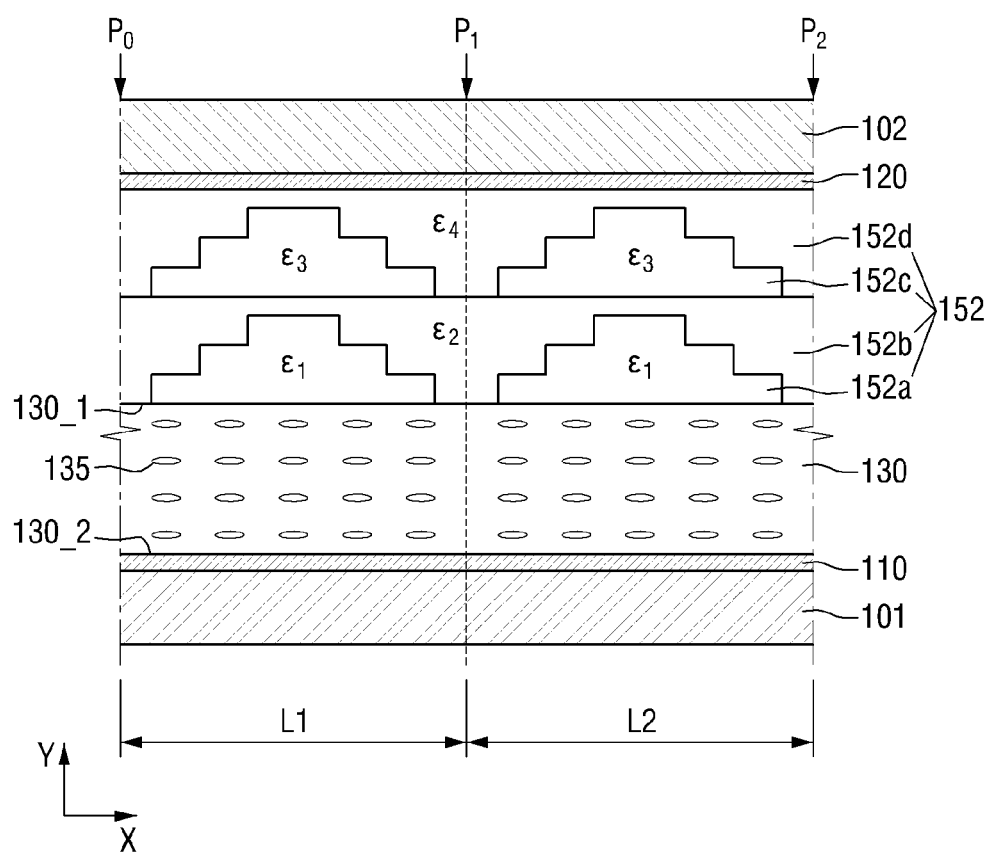

FIG. 22 is a cross-sectional view of another embodiment of a liquid crystal lens 1111. Referring to FIG. 22, the liquid crystal lens 1111 is different from the liquid crystal lens 1100 of FIG. 2 in that a dielectric layer 152 includes not only a first dielectric sub-layer 152a and a second dielectric sub-layer 152b but also a third dielectric sub-layer 152c and a fourth dielectric sub-layer 152d on the first dielectric sub-layer 152a and the second dielectric sub-layer 152b. However, the shapes and positions of the first dielectric sub-layer 152a and the second dielectric sub-layer 152b are substantially the same as those of the first dielectric sub-layer 141a and the second dielectric sub-layer 141b shown in FIG. 2. The shapes and positions of the third dielectric sub-layer 152c and the fourth dielectric sub-layer 152d are substantially the same as those of the first dielectric sub-layer 152a and the second dielectric sub-layer 152b. That is, in the embodiment of FIG. 22, the dielectric layer 141 of FIG. 2 is stacked in two layers. Accordingly, this enables the formation of a GRIN lens which has substantially the same refractive index distribution as the liquid crystal lens 1100 of FIG. 2 but has a greater gradient of change in refractive index than the liquid crystal lens 1100 of FIG. 2. Dielectric constants of the third dielectric sub-layer 152c and the fourth dielectric sub-layer 152d may be equal to or different from those of the first dielectric sub-layer 152a and the second dielectric sub-layer 152b, respectively.

Figure 23:
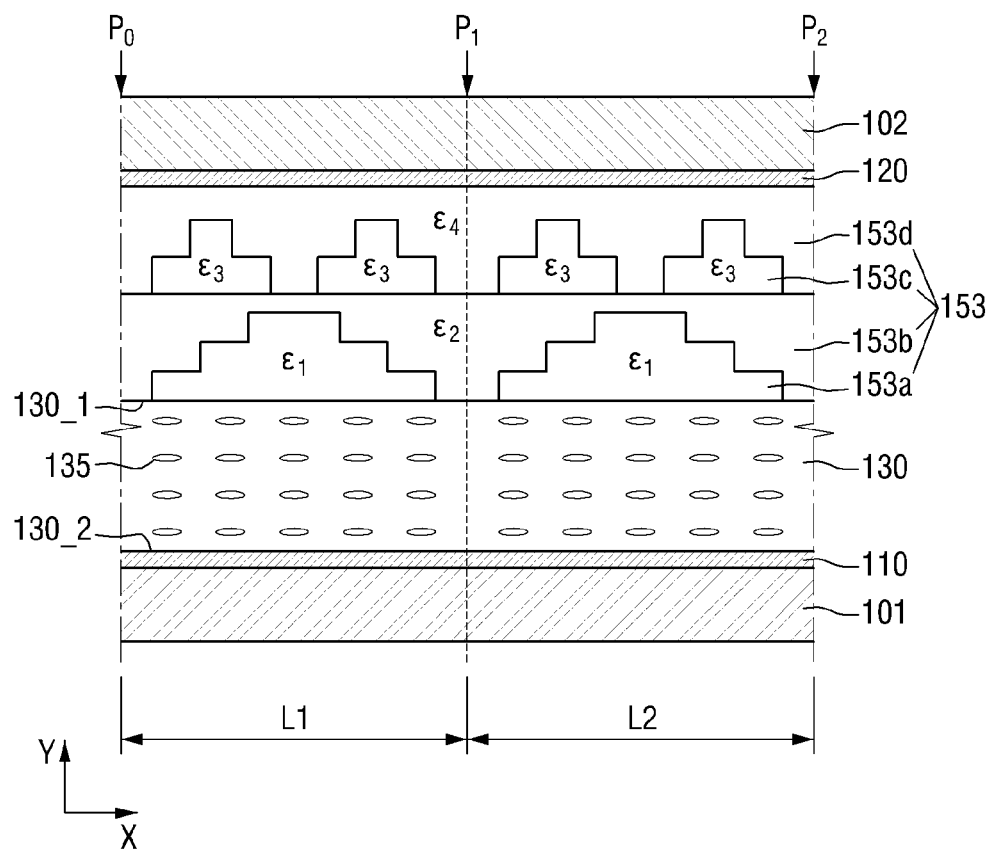
Figure 24:
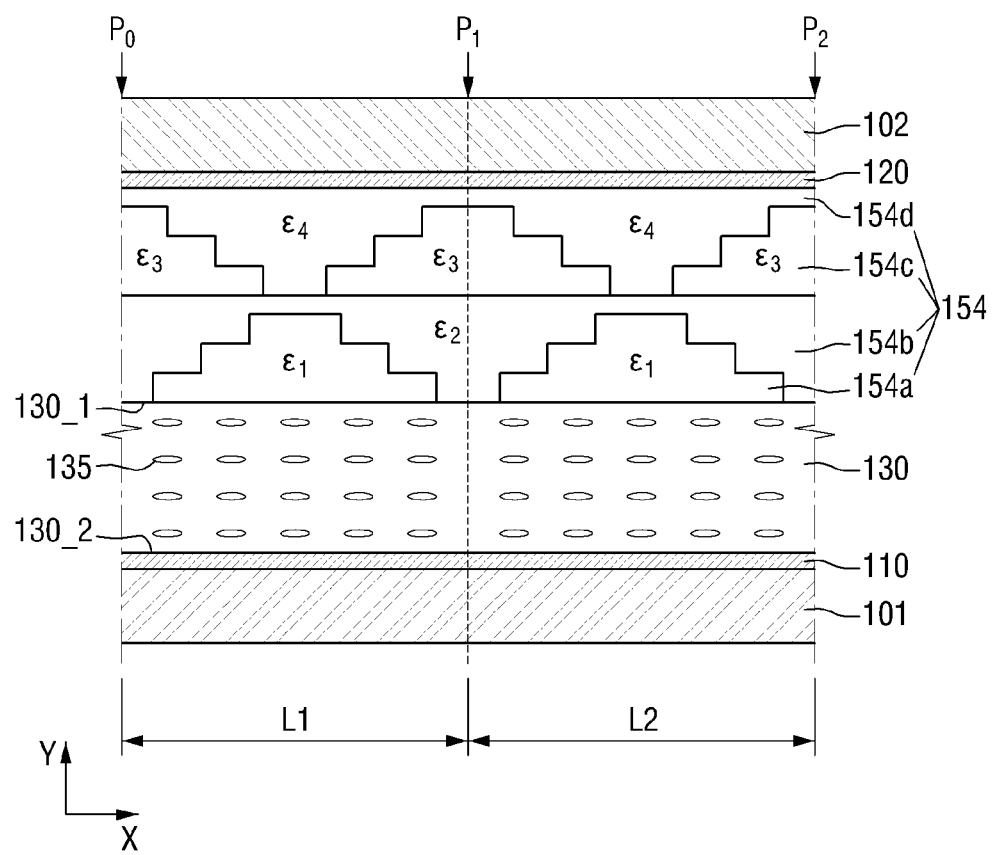

FIGS. 23 and 24 are cross-sectional views of other embodiments of liquid crystal lenses 1112 and 1113. In the liquid crystal lens 1112 of FIG. 23, the size and pitch of each unit pattern of a third dielectric sub-layer 153c are smaller than those of each unit pattern of a first dielectric sub-layer 153a. Specifically, the size and pitch of each unit pattern of the third dielectric sub-layer 153c are half the size and pitch of each unit pattern of the first dielectric sub-layer 153a. This structure is advantageous in controlling the total dielectric constant of a dielectric layer 153 more minutely. Reference numerals 153b and 153d indicate a second dielectric sub-layer and a fourth dielectric sub-layer, respectively.

In the liquid crystal lens 1113 of FIG. 24, unit patterns of a third dielectric sub-layer 154c are the same size as those of a first dielectric sub-layer 154a. However, the unit patterns of the third dielectric sub-layer 154c and the unit patterns of the first dielectric sub-layer 154a are arranged alternately. This structure enables the dielectric constant distribution to be controlled in more diverse ways. Reference numerals 154b and 154d indicate a second dielectric sub-layer and a fourth dielectric sub-layer, respectively.

Figure 25:
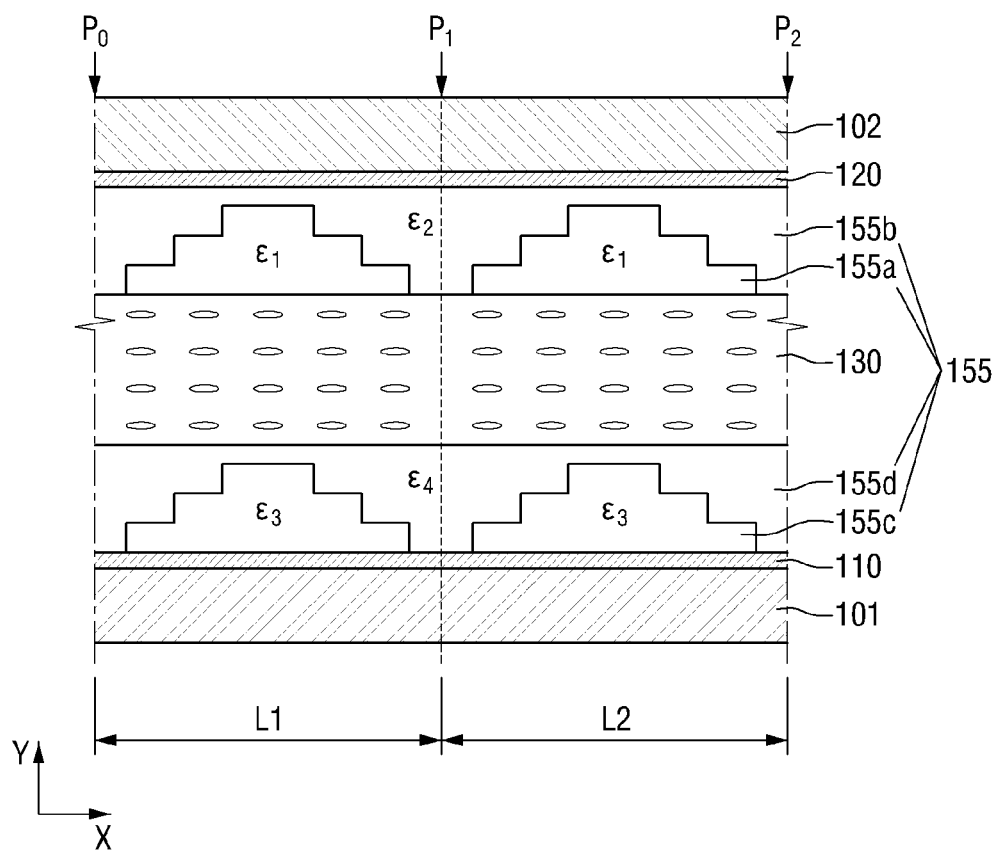

FIG. 25 is a cross-sectional view of another embodiment of a liquid crystal lens 1114. Referring to FIG. 25, the liquid crystal lens 1114 is different from the liquid crystal lens 1100 of FIG. 2 in that a third dielectric sub-layer 155c and a fourth dielectric sub-layer 155d are further formed under a liquid crystal layer 130. A first electrode 110 is disposed under the third dielectric sub-layer 155c and the fourth dielectric sub-layer 155d. A first dielectric sub-layer 155a and a second dielectric sub-layer 155b are substantially the same as those of FIG. 2. Therefore, since electrical and optical structures are substantially the same as those of FIG. 2, a GRIN lens substantially similar to that of FIG. 2 can be realized.

Figure 26:
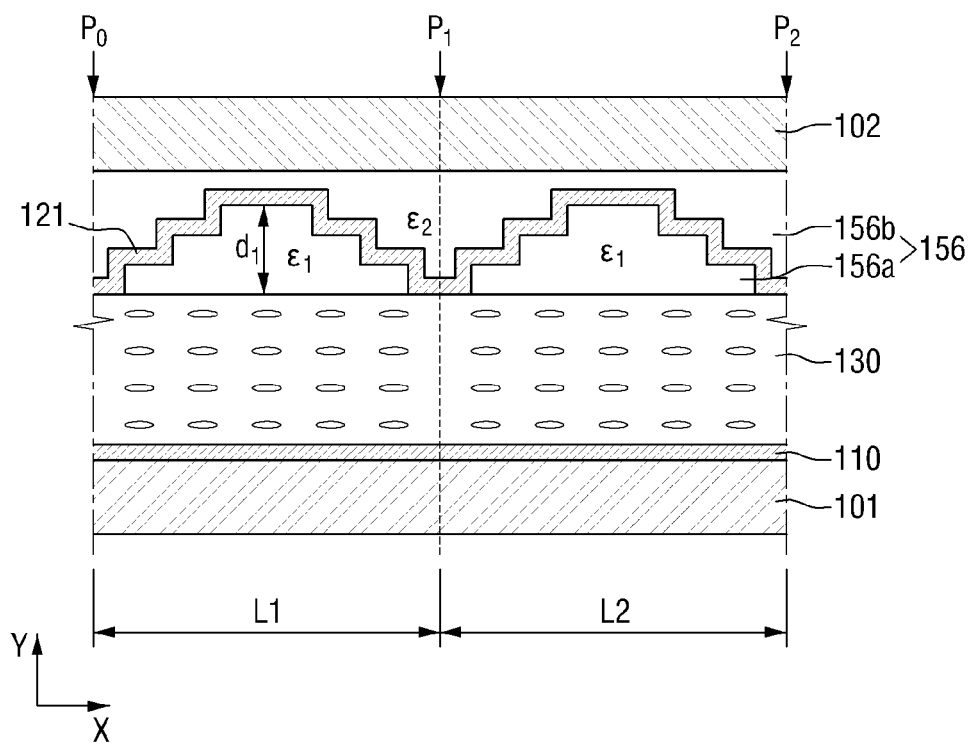

FIG. 26 is a cross-sectional view of another embodiment of a liquid crystal lens 1115. Referring to FIG. 26, the liquid crystal lens 1115 is different from the liquid crystal lens 1100 of FIG. 2 in that a second electrode 121 is not disposed between a dielectric layer 156 and a liquid crystal layer 130 but is disposed within the dielectric layer 156, specifically, between a first dielectric sub-layer 156a and a second dielectric sub-layer 156b. Since a top surface of the first dielectric sub-layer 156a is stair-shaped, the second electrode 121 formed conformally on the top surface of the first dielectric sub-layer 156a may also be stair-shaped. Only the first dielectric sub-layer 156a is formed between the second electrode 121 and a top surface of the liquid crystal layer 130, and the second dielectric sub-layer 156b is not formed between them.

Although a dielectric constant of the first dielectric sub-layer 156a is constant in a horizontal direction X, a height d1 of the first dielectric sub-layer 156a is different in each flat section, that is, changes in the horizontal direction X. Therefore, the first dielectric sub-layer 156a has different elastance 1/C in each flat section. A flat section in which the height d1 of the first dielectric sub-layer 156a is lowest has lowest elastance 1/C. However, as the height d1 of the first dielectric sub-layer 156a increases, the elastance 1/C also increases. Accordingly, it can be understood that a voltage applied to the top surface of the liquid crystal layer 130 changes along the horizontal direction X. As a result, when the liquid crystal lens 1115 is driven in a second mode, the azimuth of liquid crystal molecules 135 changes along the horizontal direction X, thereby realizing a GRIN lens structure.

In the embodiment of FIG. 26, a dielectric constant of the second dielectric sub-layer 156b does not affect an electric field applied to the liquid crystal layer 130. Therefore, the second dielectric sub-layer 156b can be omitted.

Figure 27:
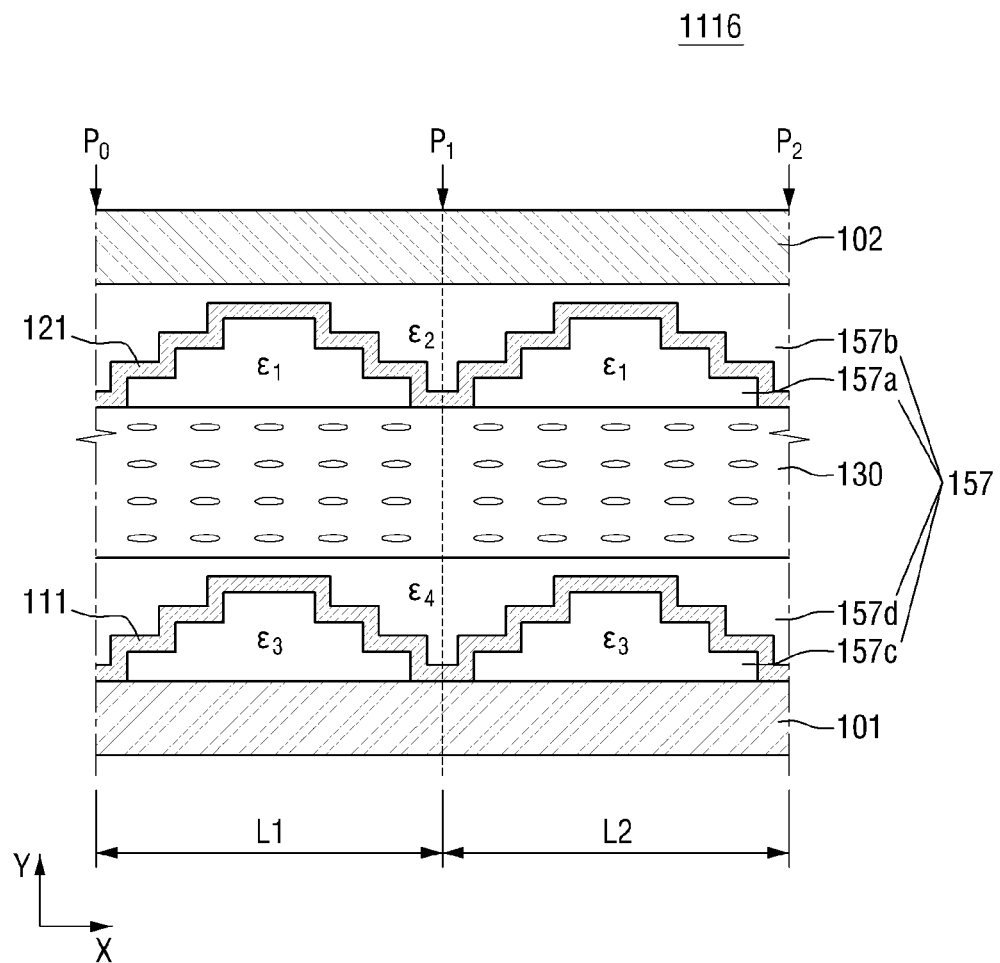

FIG. 27 is a cross-sectional view of another embodiment of a liquid crystal lens 1116. Referring to FIG. 27, the liquid crystal lens 1116 is different from the liquid crystal lens 1115 of FIG. 26 in that a third dielectric sub-layer 157c having a stair-shaped top surface and a fourth dielectric sub-layer 157d covering the third dielectric sub-layer 157c are disposed under a liquid crystal layer 130 and that a first electrode 111 is formed between the third dielectric sub-layer 157c and the fourth dielectric sub-layer 157d.

In the embodiment of FIG. 27, not only a voltage applied to a top surface of the liquid crystal layer 130 but also a voltage applied to a bottom surface of the liquid crystal layer 130 may change along a horizontal direction. Therefore, the difference between electric fields formed in the top and bottom surfaces of the liquid crystal layer 130 may double, thereby easily realizing a GRIN lens structure.

Figure 28:
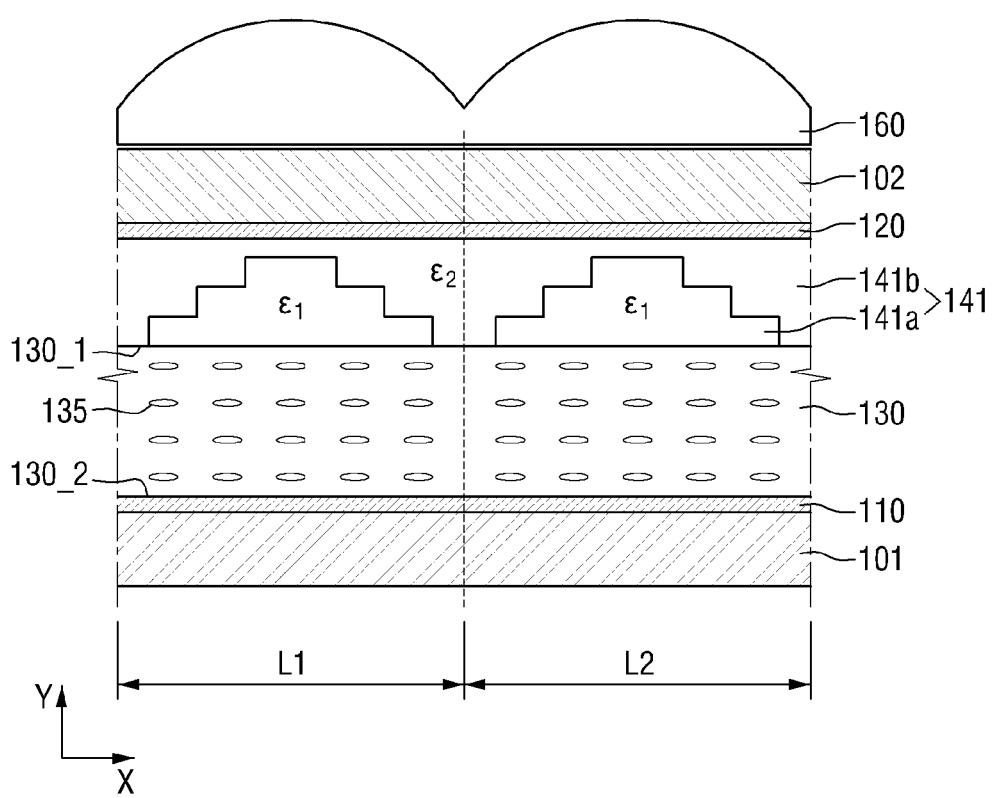

FIG. 28 is a cross-sectional view of another embodiment of a liquid crystal lens 1117. Referring to FIG. 28, the liquid crystal lens 1117 is different from the liquid crystal lens 1100 of FIG. 2 in that an optical lens 160 is further formed on a second substrate 102. The liquid crystal lens 1117 is formed by stacking the optical lens 160, whose cross section is shaped like a convex lens, on the liquid crystal lens 1100 of FIG. 2.

Unit lenses of the optical lens 160 may be arranged with substantially the same pitch as unit patterns of a first dielectric sub-layer 141a. Light modulation characteristics of the optical lens 160 may be combined with those of a GRIN lens realized by a liquid crystal layer 130, and the like, to modulate an optical path. For example, when the GRIN lens exhibits light-concentrating characteristics, the convex lens may make a focal length shorter. When the GRIN lens exhibits light-diverging characteristics, light-concentrating characteristics of the convex lens may offset the light-diffusing characteristics of the GRIN lens, thereby lessening the degree of light diffusion or concentration. Furthermore, if the diffusion and concentration of light are controlled to accurately offset each other, a path of light diverged by the GRIN lens may be changed by the optical lens 160 such that the light propagates straight. When the optical lens 160 is a concave lens, the opposite effect may obviously be brought about.

To control light in more diverse ways, the size or pitch of each unit lens of the optical lens 160 may be designed to be different from that of each unit pattern of the first dielectric sub-layer 141a.

Figure 29:
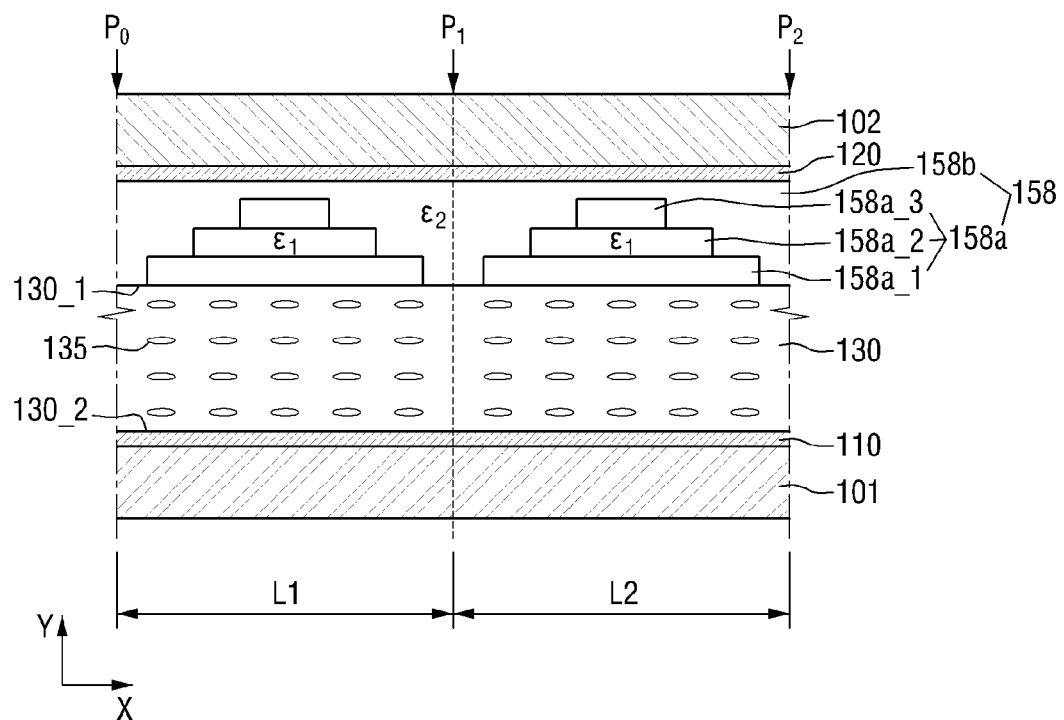

FIG. 29 is a cross-sectional view of another embodiment of a liquid crystal lens 1118. Referring to FIG. 29, the liquid crystal lens 1118 is different from the liquid crystal lens 1100 of FIG. 2 in that a first dielectric sub-layer 158a includes a plurality of stacked films 158a_1 through 158a_3.

The second stacked film 158a_2 is formed on the first stacked film 158a_1, and the third stacked film 158a_3 is formed on the second stacked film 158a_2. Each of the first through third stacked films 158a_1 through 158a_3 may have a flat top surface. The second stacked film 158a_2 may expose at least a portion of the top surface of the first stacked film 158a_1, and the exposed portion of the top surface of the first stacked film 158a_1 may serve as a flat section. Likewise, the third stacked film 158a_3 may expose at least a portion of the top surface of the second stacked film 158a_2, and the exposed portion of the top surface of the second stacked film 158a_2 may serve as another flat section. When the third stacked film 158a_3 is a highest stacked film, the top surface of the third stacked film 158a_3 may serve as another flat section.

In the embodiment of FIG. 29, the elastance 1/C distribution of a dielectric layer 158 may be substantially the same as that of the dielectric layer 141 shown in FIG. 2. Therefore, a GRIN lens structure can be formed.

The first through third stacked films 158a_1 through 158a_3 may have the same or different dielectric constants. When the first through third stacked films 158a_1 through 158a_3 have various dielectric constants, the elastance 1/C of the dielectric layer 158 can be more fine-tuned. Reference numeral 158b indicates a second dielectric sub-layer.

Figure 30:
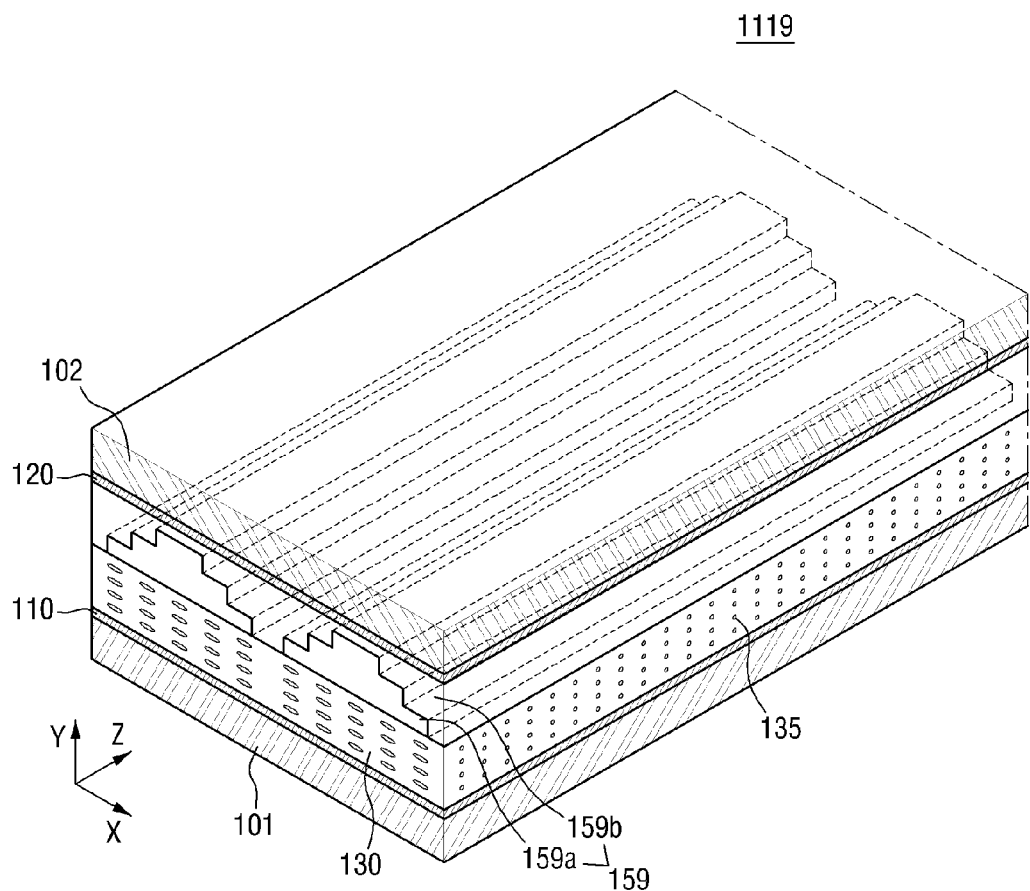
FIGS. 30 and 31 are perspective views of various embodiments of liquid crystal lenses.

FIG. 30 is a perspective view of another embodiment of a liquid crystal lens 1119. In the liquid crystal lens 1119 of FIG. 30, each unit pattern of a dielectric layer 159 extends as a substantially single body along a third direction Z perpendicular to a first direction X and a second direction Y. A first dielectric sub-layer 159a is formed as a lenticular-type layer extending along the third direction Z. Thus, like a lenticular lens, the liquid crystal lens 1119 can maintain uniform light modulation characteristics along the third direction Z. Reference numeral 159b indicates a second dielectric sub-layer.

Figure 31:
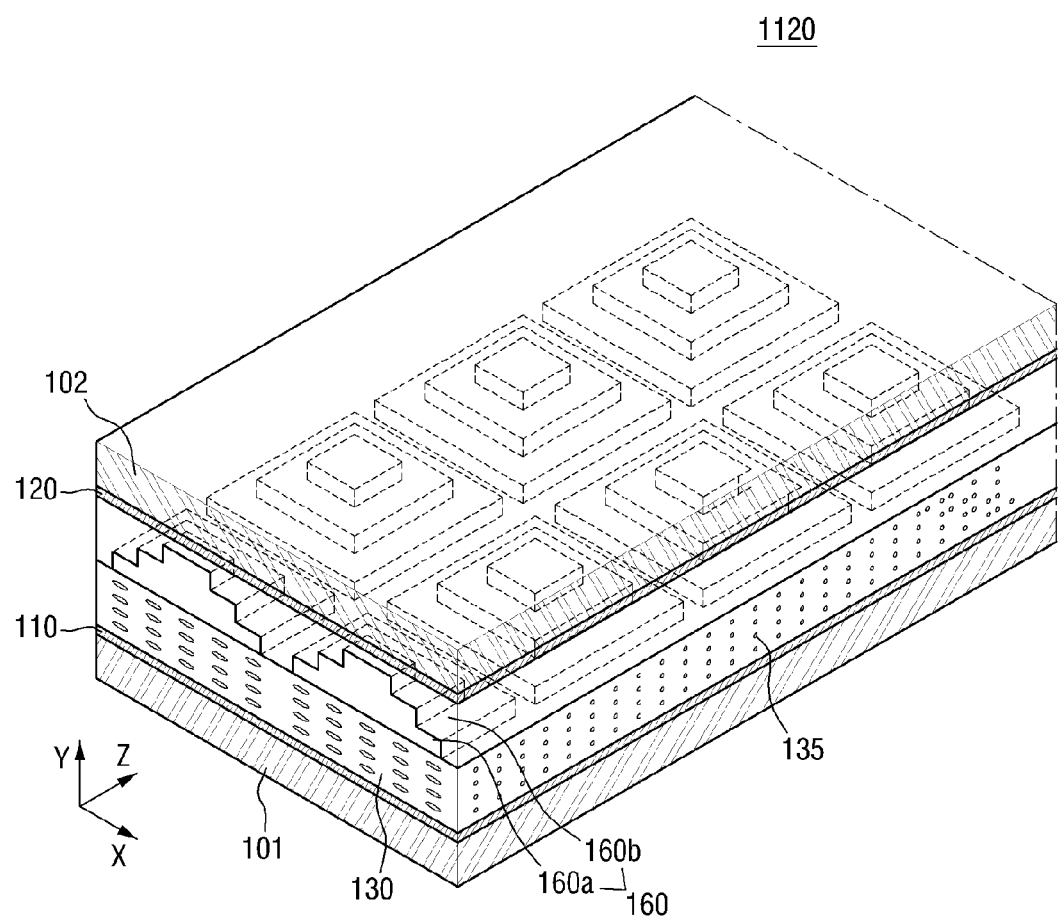

FIG. 31 is a perspective view of another embodiment of a liquid crystal lens 1120. In the liquid crystal lens 1120 of FIG. 31, a dielectric layer 160 has separate patterns along a third direction Z perpendicular to a first direction X and a second direction Y. A plurality of unit patterns are also arranged along the third direction Z. A first dielectric sub-layer 160a is formed as a microlens-type layer. Therefore, it can be understood that the first dielectric sub-layer 160a exhibits light modulation characteristics similar to those of a microlens. Reference numeral 160b indicates a second dielectric sub-layer.

The embodiments of FIGS. 30 and 31 can be combined with various embodiments described above with reference to the cross-sectional views.

The above-described embodiments of liquid crystal lenses can form a display, together with the light providing apparatus 20 as described above with reference to FIG. 1. In addition, since the liquid crystal lenses can freely change and control an optical path, they can be applied to various devices using light, such as solar cells, image sensors, etc.

Hereinafter, a specific example of a 2D/3D switchable display using both a liquid crystal lens and a display panel will be described in detail.

Figure 32:
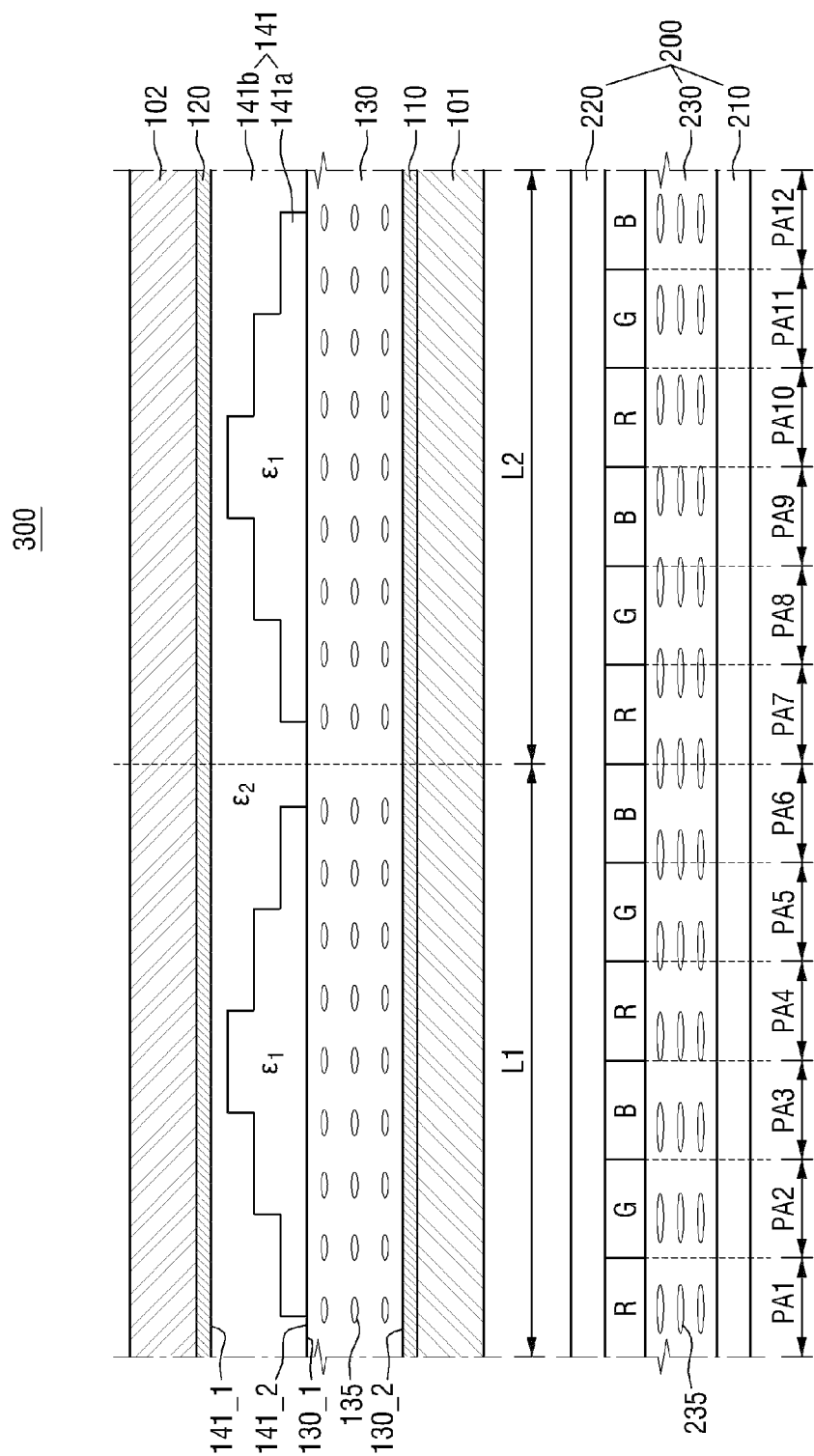
FIG. 32 is a cross-sectional view of an embodiment of a display.
Figure 33:
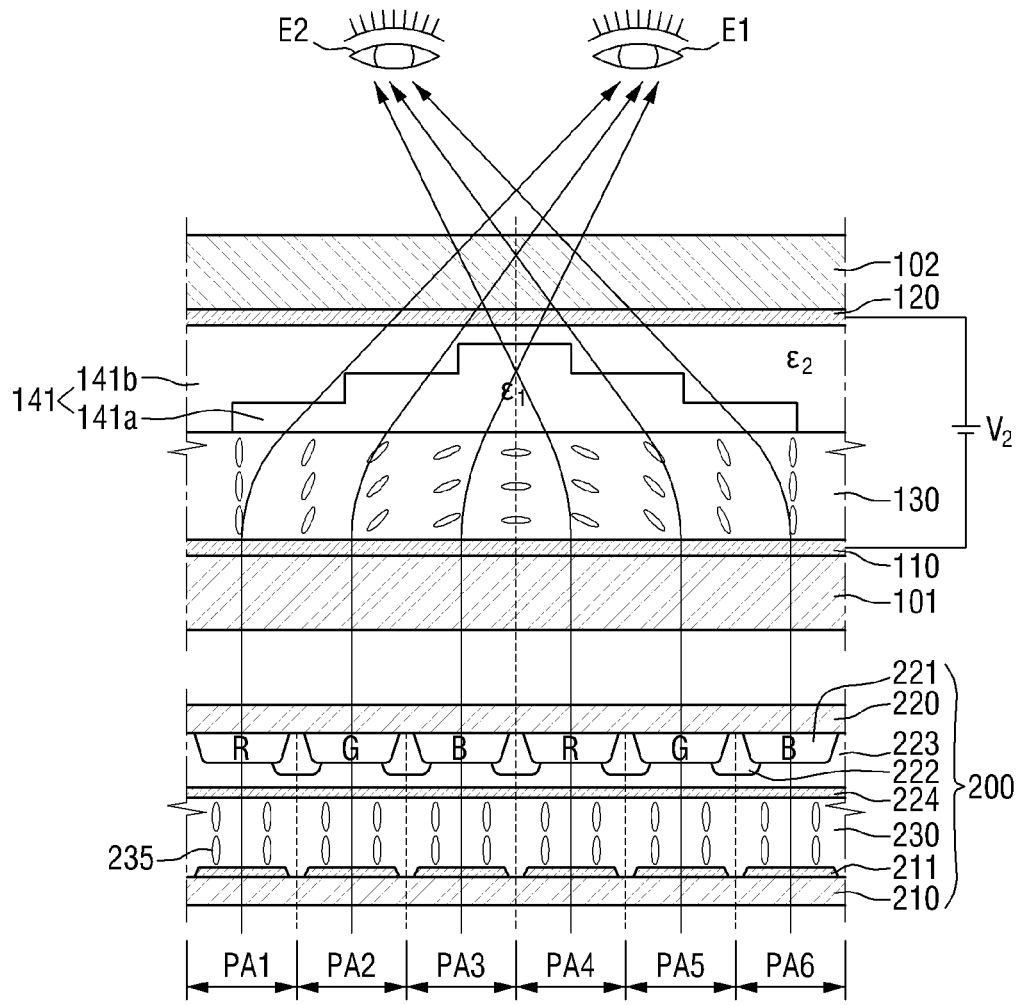
FIG. 33 is a cross-sectional view illustrating the operation of the display of FIG. 32 in a second mode.

FIG. 32 is a cross-sectional view of an embodiment of a display 300. FIG. 33 is a cross-sectional view illustrating the operation of the display 300 of FIG. 32 in a second mode. In FIGS. 32 and 33, the liquid crystal lens 1100 of FIG. 2 is employed as a liquid crystal lens, and a liquid crystal display panel is employed as a light providing apparatus.

Referring to FIGS. 32 and 33, the display 300 includes a liquid crystal display panel 200 and a liquid crystal lens 1100.

The liquid crystal display panel 200 includes a lower substrate 210 and an upper substrate 220 which face each other and a liquid crystal molecule layer 230 which is interposed between the lower and upper substrates 210 and 220.

A plurality of pixel electrodes 211 are formed on the lower substrate 210 respectively in a plurality of pixel regions PA1 through PA12 arranged in a matrix. Each of the pixel electrodes 211 is connected to a switching device such as a thin-film transistor and receives a pixel voltage individually from the switching device.

A common electrode 224 is disposed under the upper substrate 220 to face the pixel electrodes 211. Red (R), green (G), and blue (B) color filters 221 may be disposed on the upper substrate 220 to correspond to the pixel regions PA1 through PA12, respectively. A black matrix 222 may be formed at boundaries between the pixel regions PA1 through PA12. A planarization film 223 may be interposed between the color filters 221 and the common electrode 224.

The liquid crystal molecule layer 230 is interposed between the lower substrate 210 and the upper substrate 220. Liquid crystal molecules 235 of the liquid crystal molecule layer 230 are rotated by an electric field formed between the pixel electrodes 211 and the common electrode 224 to control the transmittance of the liquid crystal display panel 200.

A polarizing plate (not shown) may be attached to an outer surface of each of the lower substrate 210 and the upper substrate 220. In some embodiments, a polarizing plate (not shown) may also be attached to an outer surface of a first substrate 101 of the liquid crystal lens 1100. In such embodiments, the polarizing plate on the upper substrate 220 can be omitted.

A backlight assembly (not shown) may be disposed under the liquid crystal display panel 200.

The liquid crystal lens 1100 is disposed on the liquid crystal display panel 200. In the drawings, the liquid crystal lens 1100 is separated from the liquid crystal display panel 200. In other embodiments, and the liquid crystal lens 1100 can be attached to the liquid crystal display panel 200.

Unit lens sections L1 and L2 of the liquid crystal lens 1100 may be arranged to correspond to the pixel regions PA1 through PA12 of the liquid crystal display panel 200. In FIG. 32, six pixel regions correspond to one unit lens section. That is, six pixel regions of R, G, B, R, G, and B are arranged within a width of one unit lens section.

In the display 300, when the liquid crystal lens 1100 is driven in a first mode, the display 300 may display a 2D image since the liquid crystal lens 1100 does not particularly modulate an optical path. When the liquid crystal lens 1100 is driven in the second mode, the display 300 may display a 3D image, which will be described in greater detail with reference to FIG. 33.

Referring to FIG. 33, optical characteristics of the liquid crystal lens 1100 in the second mode are similar to those of a convex lens, as described above with reference to FIGS. 2 and 3. Therefore, paths of rays of light incident on each unit lens section L1 or L2 from three pixel regions (R, G and B) arranged to the left of a center of the corresponding unit lens section L1 or L2 are changed as if the rays of light passed through a left region of a convex lens. Accordingly, the rays of light bend to the right. On the other hand, paths of rays of light incident on each unit lens section L1 or L2 from three pixel regions (R, G and B) arranged to the right of the center of the corresponding unit lens section L1 or L2 are changed as if the rays of light passed through a right region of the convex lens. Accordingly, the rays of light bend to the right. When the above rays of light are input to a left eye E1 and a right eye E2 of a viewer, the viewer may perceive a 3D image.

In the embodiments of FIGS. 32 and 33, six pixel regions are arranged within the width of one unit lens section. In other embodiments, more than six pixel regions can also be arranged within the width of one unit lens section. In such embodiments, a multi-view 3D image can be displayed. In addition, since a focal length of the liquid crystal lens 1100 can be changed by controlling voltages applied to a first electrode 110 and a second electrode 120 of the liquid crystal lens 1100 as described above, a distance to a point of view at which a 3D image is viewable can be controlled. For example, when a viewer activates a viewpoint switching mode of the display 300 using a remote control, the voltages applied to the first and second electrodes 110 and 120 of the liquid crystal lens 1100 may be changed sequentially, thereby moving the point of view forward or backward. In this way, a point of view at which a 3D image is viewable can be found conveniently.

In some other embodiments, a common voltage applied to the common electrode 224 of the liquid crystal display panel 200 may be the same as a first voltage applied to the first electrode 110 of the liquid crystal lens 1100 or a second voltage applied to the second electrode 120. In such embodiments, a driving circuit can be simplified.

In addition, in some other embodiments, either of the upper substrate 220 of the liquid crystal display panel 200 and the first substrate 101 of the liquid crystal lens 1100 can also play the role of the other one. Therefore, any one of the upper substrate 220 of the liquid crystal display panel 200 and the first substrate 101 of the liquid crystal lens 1100 can be omitted. Further, either of the common electrode 224 of the liquid crystal display panel 200 and the first electrode 110 of the liquid crystal lens 1100 can also play the role of the other one, and thus any one of them can be omitted.

In the embodiment of FIGS. 32 and 33, the liquid crystal display panel 200 is employed as the light providing apparatus. However, any one of an OLED display panel, an LED display panel, an inorganic EL display panel, an FED panel, an SED panel, a PDP, a CRT display panel, and an EPD panel can also be employed as described above. Since an embodiment for this case can be very easily inferred from the embodiment of FIGS. 32 and 33 by those of ordinary skill in the art, a detailed description thereof will be omitted.

In the embodiment of FIGS. 32 and 33, the liquid crystal lens 1100 of FIG. 2 is employed as a liquid crystal lens. However, it is obvious that liquid crystal lenses according to various embodiments described herein can also be employed.

Figure 34:
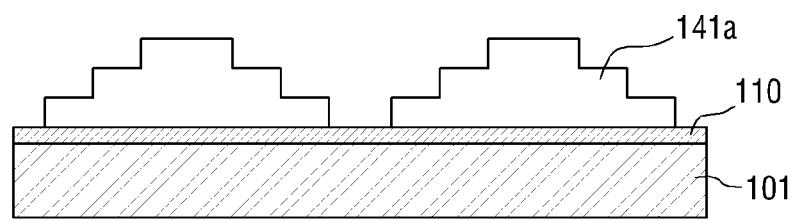
FIG. 34 is a cross-sectional view illustrating processes in an embodiment of a method of manufacturing a liquid crystal lens.

Hereinafter, embodiments of methods of manufacturing a liquid crystal lens will be described. FIG. 34 is a cross-sectional view illustrating processes in an embodiment of a method of manufacturing a liquid crystal lens.

Referring to FIG. 34, a first electrode 110 is formed on a first substrate 101. A material layer for forming a first dielectric sub-layer 141a is stacked on the first electrode 110 and then patterned to form the first dielectric sub-layer 141a having a plurality of unit patterns. Here, the patterning of the material layer for forming the first dielectric sub-layer 141a may be performed using a photolithography process. Next, a material layer for forming a second dielectric sub-layer is stacked on the first dielectric sub-layer 141a and then patterned to form the second dielectric sub-layer as desired. After the formation of the second dielectric sub-layer, a liquid crystal layer and a second substrate having a second electrode are stacked on the second dielectric sub-layer, thereby completing a liquid crystal lens.

In some embodiments, the material layer for forming the first dielectric sub-layer 141a may be stacked on the first electrode 110 on the first substrate 101. In other embodiments, the material layer for forming the second dielectric sub-layer may be formed on the second electrode on the second substrate, and then subsequent processes may be performed.

Figure 35:
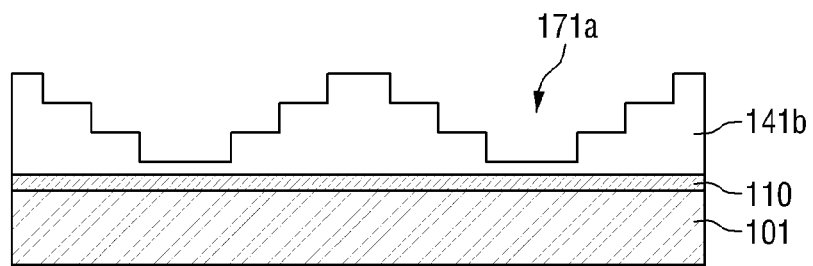
FIG. 35 is a cross-sectional view illustrating processes in another embodiment of a method of manufacturing a liquid crystal lens.

FIG. 35 is a cross-sectional view illustrating processes in another embodiment of a method of manufacturing a liquid crystal lens.

Referring to FIG. 35, a first electrode 110 is formed on a first substrate 101. A material layer for forming a second dielectric sub-layer 141b is stacked on the first electrode 110 and then patterned to form the second dielectric sub-layer 141b having a plurality of recessed regions 171a. The patterning of the material layer for forming the second dielectric sub-layer 141b may be performed using a photolithography process. Next, the recessed regions 171a of the second dielectric sub-layer 141b are filled with a material layer for forming a first dielectric sub-layer and then patterned to form the first dielectric sub-layer having a plurality of unit patterns, as desired. After the formation of the first dielectric sub-layer, a liquid crystal layer and a second substrate having a second electrode are stacked on the first and second dielectric sub-layers, thereby completing a liquid crystal lens.

In some embodiments, the material layer for forming the second dielectric sub-layer 141b is stacked on the first electrode 110 on the first substrate 101. In other embodiments, the material layer for forming the first dielectric sub-layer may be formed on the second electrode on the second substrate, and then subsequent processes may be performed.

Embodiments of the present invention provide at least one of the following advantages.

Embodiments of the liquid crystal lens can control an optical path in various ways. Therefore, the liquid crystal lens can be applied to various devices using light, such as solar cells, image sensors, etc.

In addition, a display which employs an embodiment of the liquid crystal lens can control an optical path in various ways. Thus, it can switch between 2D and 3D modes to display both 2D and 3D images.

Furthermore, since a focal length can be adjusted easily, a point of view at which a 3D image is viewable can be found conveniently.

However, the effects of the present invention are not restricted to the one set forth herein. The above and other effects of the present invention will become more apparent to one of daily skill in the art to which the present invention pertains by referencing the claims.

What is claimed is:
1. A liquid crystal lens comprising;
  a first electrode and a second electrode which face each other;
  a liquid crystal layer interposed between the first electrode and the second electrode, wherein the liquid crystal layer has a flat top surface and a flat bottom surface; and
  a dielectric layer interposed between the second electrode and the liquid crystal layer,
  wherein the dielectric layer comprises a first dielectric sub-layer and a second dielectric sub-layer, the first dielectric sub-layer is made of a material having a different dielectric constant from that of a material that forms the second dielectric sub-layer, the first dielectric sub-layer comprises one or more unit patterns, wherein each of the unit patterns defines a unit lens section which exhibits an optical characteristic, wherein a surface of each of the unit patterns comprises a plurality of flat sections, and a height of each of the unit patterns in a first flat section among the flat sections is different from the height thereof in a second flat section.

2. The liquid crystal lens of claim 1, wherein the dielectric layer has a flat top surface and a flat bottom surface.

3. The liquid crystal lens of claim 2, wherein the top and bottom surfaces of the dielectric layer and each of the flat sections are parallel to each other.

4. The liquid crystal lens of claim 2, wherein a cross section of each of the unit patterns is stair-shaped.

5. The liquid crystal lens of claim 2, wherein the second flat section neighbors the first flat section, and the first flat section and the second flat section are connected by a vertical sidewall or a diagonal section.

6. The liquid crystal lens of claim 1, wherein a refractive index of the first dielectric sub-layer is different from that of the second dielectric sub-layer.

7. The liquid crystal lens of claim 1, wherein a surface of the first dielectric sub-layer is covered with the second dielectric sub-layer.

8. The liquid crystal lens of claim 1, wherein the unit patterns of the first dielectric sub-layer are separated from each other and are surrounded by the second dielectric sub-layer.

9. The liquid crystal lens of claim 1, wherein the unit patterns of the first dielectric sub-layer have the same shape and are arranged uniformly along a horizontal direction.

10. The liquid crystal lens of claim 1, wherein each of the first electrode and the second electrode is a whole-surface electrode.

11. The liquid crystal lens of claim 10, wherein the first electrode and the second electrode are placed parallel to each other.

12. The liquid crystal lens of claim 1, further comprising an optical lens which is disposed on the second electrode.

13. The liquid crystal lens of claim 1, wherein each of the unit patterns comprises a first stacked film having a flat first surface and a flat second surface and a second stacked film having a flat first surface and a flat second surface, wherein the second stacked film is formed on the first surface of the first stacked film to expose part of the first surface of the first stacked film, the first flat section comprises a section in which an exposed region of the first surface of the first stacked film, and the second flat section comprises at least part of a section in which the first surface of the second stacked film is located.

14. The liquid crystal lens of claim 13, wherein a dielectric constant of the first stacked film is equal to a dielectric constant of the second stacked film.

15. The liquid crystal lens of claim 1, wherein each of the lens unit sections forms a GRIN lens structure.

16. A liquid crystal lens comprising:
a first electrode;
a liquid crystal layer disposed on the first electrode;
a dielectric layer disposed on the liquid crystal layer; and
a second electrode formed conformally on a top surface of the dielectric layer,
wherein the dielectric layer comprises one or more unit patterns, wherein each unit pattern defines a unit lens section which exhibits an optical characteristic, wherein a top surface of each of the unit patterns comprises a plurality of flat sections, and a height of each of the unit patterns in a first flat section among the flat sections is different from the height thereof in a second flat section.

17. A display comprising:
a light providing apparatus; and
a liquid crystal lens disposed on the light providing apparatus,
wherein the liquid crystal lens comprises:
a first electrode and a second electrode which face each other;
a liquid crystal layer interposed between the first electrode and the second electrode and having a flat top surface and a flat bottom surface; and
a dielectric layer which is interposed between the second electrode and the liquid crystal layer,
wherein the dielectric layer comprises a first dielectric sub-layer and a second dielectric sub-layer, the first dielectric sub-layer is made of a material having a different dielectric constant from that of a material that forms the second dielectric sub-layer, the first dielectric sub-layer comprises one or more unit patterns, wherein each of the unit patterns defines a unit lens section which exhibits an optical characteristic, wherein a surface of each of the unit patterns comprises a plurality of flat sections, and a height of each of the unit patterns in a first flat section among the flat sections is different from the height thereof in a second flat section.

18. The display of claim 17, wherein the light providing apparatus comprises a display panel.

19. The display of claim 18, wherein the display panel is any one of an organic light-emitting diode (OLED) display panel, a light-emitting diode (LED) display panel, an inorganic electroluminescent (EL) display panel, a field emission display (FED) panel, a surface-conduction electron-emitter display (SED) panel, a plasma display panel (PDP), a cathode ray tube (CRT) display panel, a liquid crystal display (LCD) panel, and an electrophoretic display (EPD) panel.

20. The display of claim 18, wherein the display panel comprises a plurality of pixel regions arranged in a matrix, and the first dielectric sub-layer comprises a plurality of unit patterns connected to each other, wherein two or more of the pixel regions are arranged within a width of each unit pattern.

21. The display of claim 18, wherein the display panel comprises a plurality of pixel regions arranged in a matrix, and the first dielectric sub-layer comprises a plurality of unit patterns separated from each other, wherein two or more of the pixel regions are arranged in a pitch of each of the unit patterns.

22. The display of claim 17, wherein a sum of a height of the first dielectric sub-layer and a height of the second dielectric sub-layer is constant along a horizontal direction.

23. The display of claim 17, wherein a refractive index of the first dielectric sub-layer is different from that of the second dielectric sub-layer.

24. A method of manufacturing a liquid crystal lens, the method comprising:
forming a dielectric layer on a first electrode; and
placing a liquid crystal layer and a second electrode on the dielectric layer,
wherein the dielectric layer comprises a first dielectric sub-layer and a second dielectric sub-layer, the first dielectric sub-layer is made of a material having a different dielectric constant from that of a material that forms the second dielectric sub-layer, the first dielectric sub-layer comprises one or more unit patterns, wherein each of the unit patterns defines a unit lens section which exhibits an optical characteristic, wherein a surface of each of the unit patterns comprises a plurality of flat sections, and a height of each of the unit patterns in a first flat section among the flat sections is different from the height thereof in a second flat section.

25. The method of claim 24, wherein the forming of the dielectric layer comprises:
forming the unit patterns of the first dielectric sub-layer on the first electrode; and
stacking the second dielectric sub-layer on the unit patterns.

26. The method of claim 24, wherein the forming of the dielectric layer comprises:
forming a second dielectric sub-layer, which comprises recessed regions, on the first electrode; and
filling the recessed regions with the first dielectric sub-layer.

* * * * *